United States Patent [19]

Kumagai et al.

[11] Patent Number: 5,071,500
[45] Date of Patent: Dec. 10, 1991

[54] METHOD OF AND APPARATUS FOR FUSING RESIN MEMBERS SUCH AS BUMPER BEAM AND BUMPER FACE OF AUTOMOBILE BUMPER

[75] Inventors: Syuno Kumagai; Junichi Saita; Yoji Ushiki, all of Saitama; Kunio Kishino, Tochigi; Shoji Sato, Saitama; Yoshiki Ishige, Saitama; Tuneo Ishihara, Saitama; Hisashi Masuda, Saitama, all of Japan

[73] Assignee: Honda Giken Kogyo Kabushiki Kaisha, Tokyo, Japan

[21] Appl. No.: 65,586

[22] Filed: Jun. 23, 1987

[51] Int. Cl.⁵ .............................................. B32B 31/00
[52] U.S. Cl. ................................. 156/152; 156/273.3; 156/309.9; 156/322; 156/380.9; 156/499; 293/120
[58] Field of Search ............... 156/273.3, 309.9, 380.9, 156/322, 499, 152; 293/120

[56] References Cited

U.S. PATENT DOCUMENTS

| | | | |
|---|---|---|---|
| 2,554,150 | 5/1951 | Moore | 156/152 |
| 2,665,738 | 1/1954 | Caskin | 156/322 |
| 3,175,939 | 3/1965 | Hanes et al. | 156/499 |
| 4,652,032 | 3/1987 | Smith | 293/120 |

FOREIGN PATENT DOCUMENTS 2258987 8/1975 France ................ 293/120
2081653 2/1982 United Kingdom .

Primary Examiner—John J. Gallagher

[57] ABSTRACT

An automobile bumper comprises a bumper face and a bumper beam constructed of members molded of thermoplastic resin. The bumper beam includes at least two members of thermoplastic resin having flanges for forming beam flanges together when the members are fused to each other, the beam flanges being fused to an inner surface of the bumper face. An FRP sheet is continuously heated in an atmosphere having a temperature successively lowered from a temperature higher than a resin melting temperature at which a resin of the FRP sheet is melted so that the entire FRP sheet is increased through successive heating stages to a temperature between the resin melting temperature and a resin degradation temperature at which the resin of the FRP sheet is degraded. Heaters are brought into close proximity with joining surfaces to be fused of at least two parts of synthetic resin with a prescribed spacing therebetween for melting the joining surfaces, and thereafter the melted joining surfaces are pressed against each other to fuse the parts together. At least one of the at least two parts comprises an FRP product made of glass fibers reinforced with a thermoplastic resin, the joining surfaces of the FRP product having a plurality of projections containing the thermoplastic resin only, the projections being melted when the parts are fused together.

7 Claims, 12 Drawing Sheets

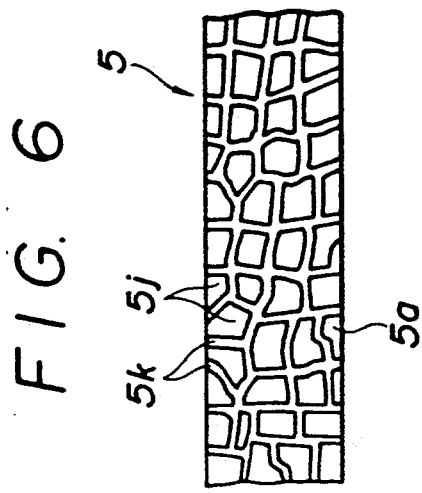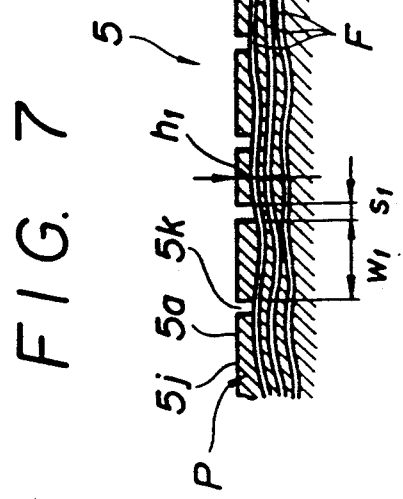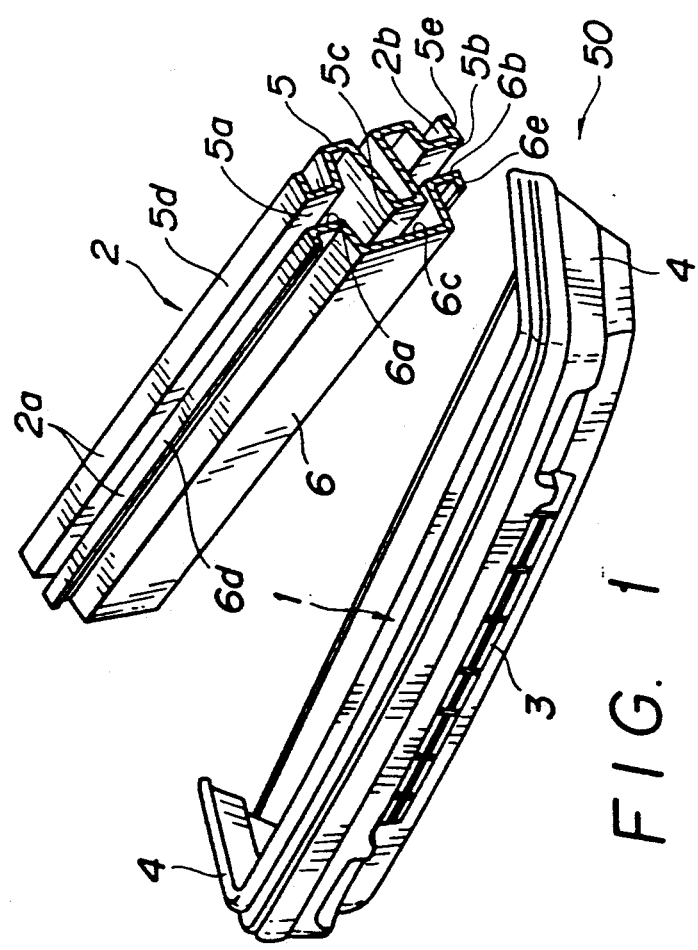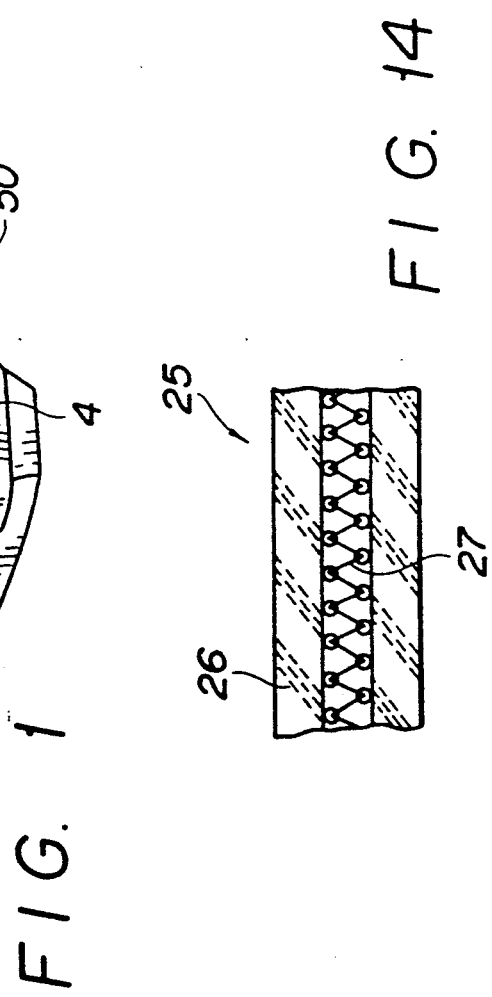

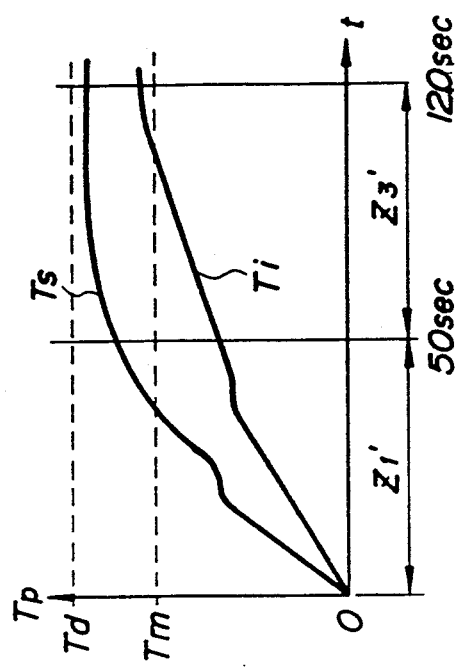
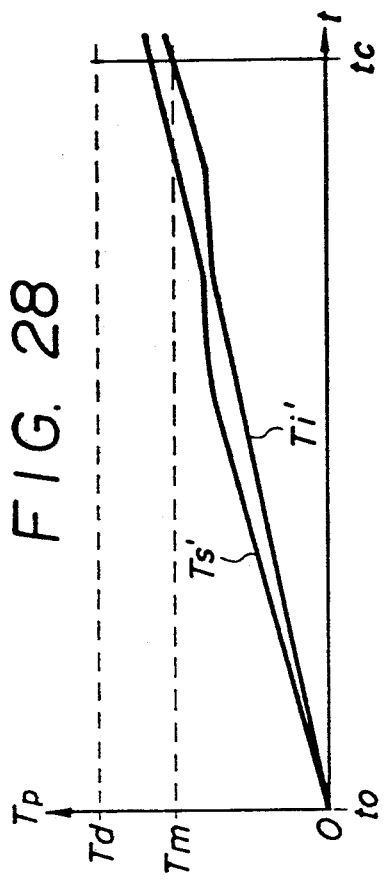
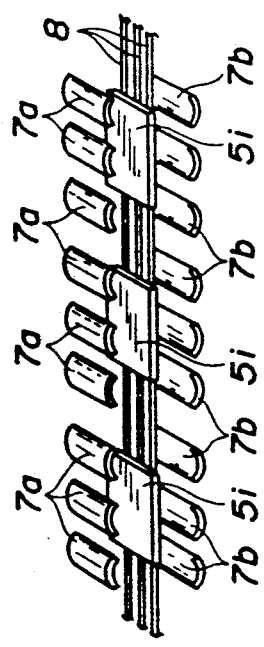
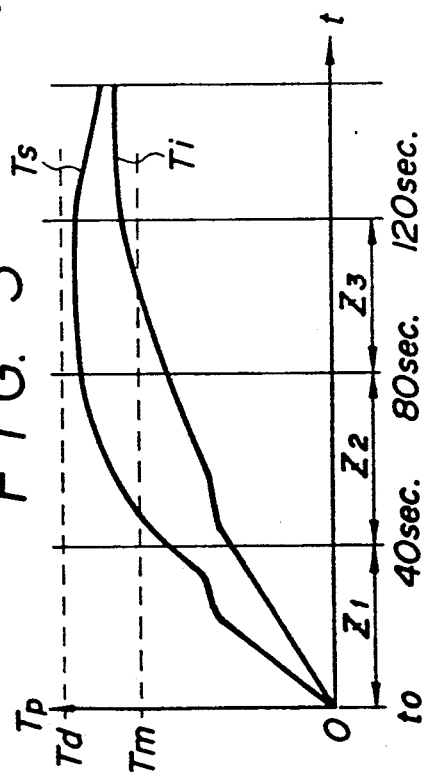
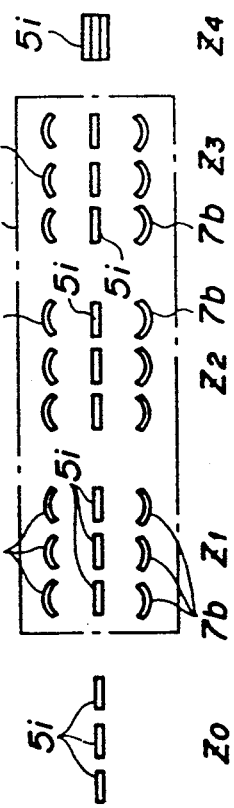

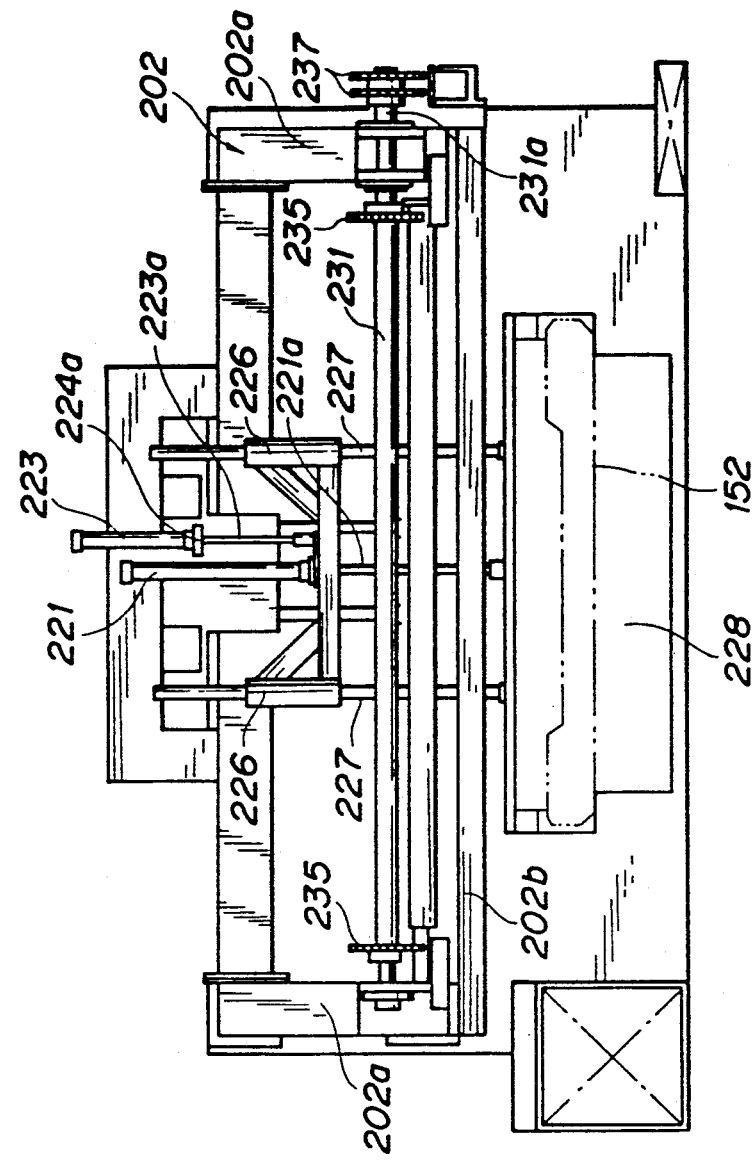
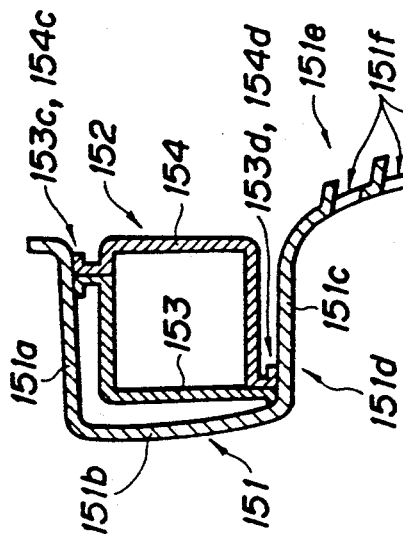

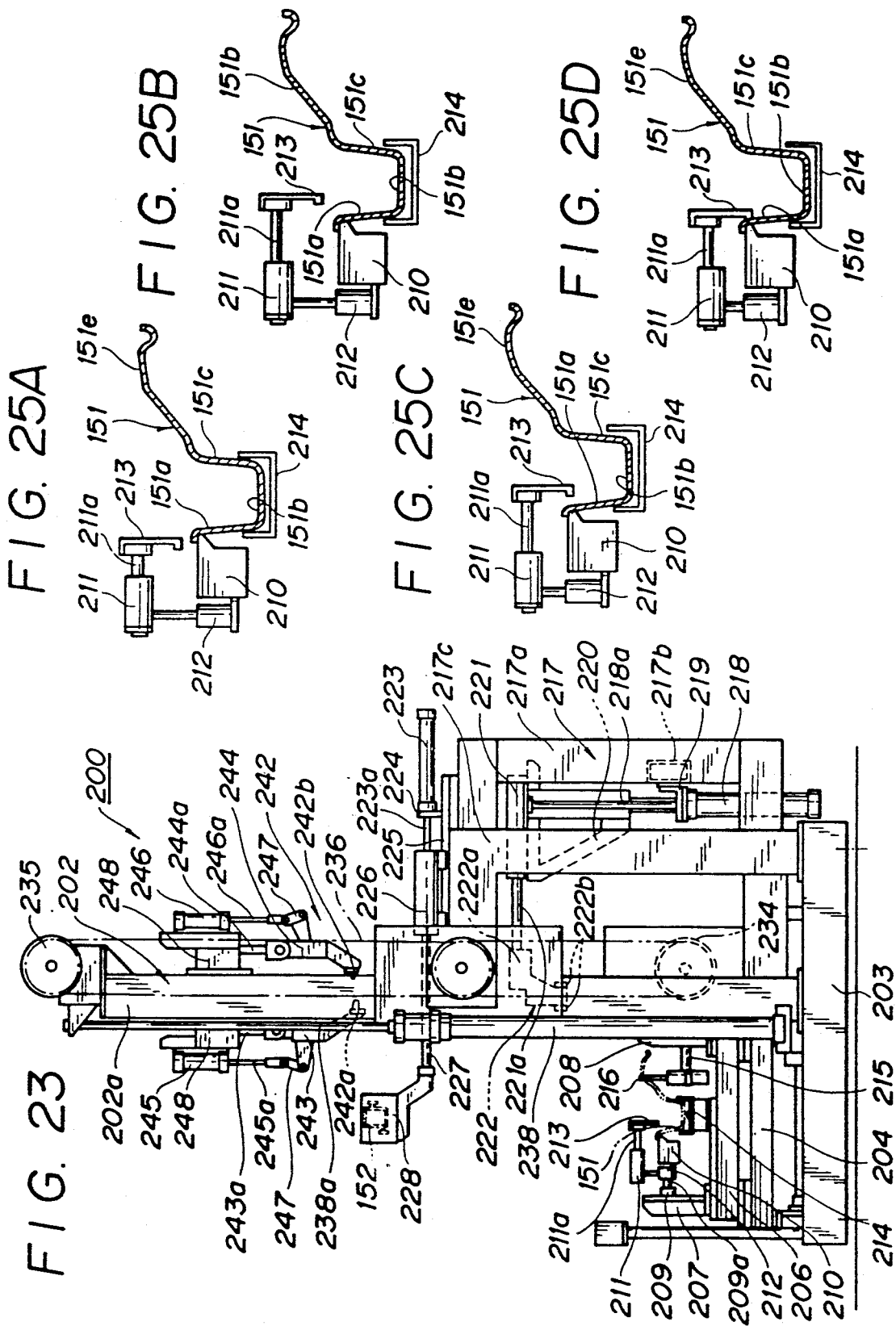

METHOD OF AND APPARATUS FOR FUSING RESIN MEMBERS SUCH AS BUMPER BEAM AND BUMPER FACE OF AUTOMOBILE BUMPER

BACKGROUND OF THE INVENTION

1. Field of the Invention

The present invention relates to a method of and an apparatus for joining resin parts, and more particularly to a method of and apparatus for fusing resin parts or members such as the bumper beam and bumper face of an automobile bumper.

2. Description of the Relevant Art

Automobile bumpers generally comprise an outer bumper face and an inner bumper beam joined to an inner surface of the bumper face for reinforcing the same, the bumper is adapted to be mounted on an automobile body. The bumper face and beam have heretofore been heavy and liable to produce rust since they are made of pressed steel sheet.

Thermoplastic resin such as polypropylene or polyethylene is employed to make relatively large products inasmuch as it is lightweight and highly rigid. When automobile bumpers are constructed of such thermoplastic resin, they are lightweight and less apt to develop rust. For injection molding a relativley large resin component, it is general to form smaller divided members separately and then join the formed members subsequently into the resin component so that molds required are not increased in size and molded members can easily be removed from the molds. It is preferable to form an automobile bumper by molding a bumper beam and a bumper face separately. Various methods are available to join the bumper beam and face to each other. For example, they may be joined by adhesive, or interconnected by mechanical parts such as screws. Since they are made of thermoplastic resin, they may be joined by heating and fusing their joining surfaces with panel heaters held thereagainst and then pressing the fused joining surfaces to each other to connect the members integrally to each other.

The bumper beam is required to be higher in rigidity since it supports the bumper face, and hence should be reinforced by another member. A plastic composite material has been developed which is known as stampable resin sheet, which can be stamped to a desired shape. One known such stampable resin sheet is a glass fiber reinforced resin or plastic (hereinafter referred to as FRP) sheet comprising glass fibers impregnated with thermoplastic resin such as polypropylene or polyethylene. This sheet has a thickness ranging from 2 to 4 mm. It is preferable to form the above divided members by stamping a lamination of such sheets. The resin sheet thus formed is as rigid as steel sheet.

Before stamping a lamination of FRP sheets, each of the sheets must be fused by a heater or in a heated atmosphere. However, since the thermal conductivity of the resin is small, if the sheet were quickly heated, the surface layer thereof would reach a degradation temperature Td before the inside portion of the sheet would reach a melting temperature, resulting in degradation of the sheet. Therefore, it is current practice to heat an FRP sheet gradually in a relatively low-temperature atmosphere so that the temperature Ti' of the inside area of the sheet reaches a resin melting temperature Tm before the temperature Ts' of the surface layer of the sheet reaches a resin degradation temperature Td, as shown in FIG. 28 of the accompanying drawings. The graph of FIG. 28 has a horizontal axis representing heating time t and a vertical axis representing resin temperature Tp. It takes 4 minutes and 30 seconds to reach a heating completion time tc after a heating starting time tO. Accordingly, the efficiency of the heat treatment of the sheet is low, and so is the production rate for stamping the lamination of FRP sheets.

The processes for joining resin members using adhesive of mechanical parts are complex and have a low production efficiency. The process for joining resin members through fusion is more preferable.

Even where the latter fusion process is employed, however, it is somewhat difficult to have large joining areas of the bumper face and beam. Moreover, fused resin may be attached to the panel heaters, and foreign matter such as carbides may be trapped in the fused areas of the bumper face and beam, resulting in a reduced degree of bonding strength. One solution to these problems is to coat the surfaces of the panel heaters with Teflon. However, since Teflon layers are likely to peel off, the panel heaters have to be replaced periodically. In case the joining surfaces of the bumper beam and face are of different shapes, different heaters should be used for heating the jointing areas of different shapes. With an increased number of heaters used, the entire fusing apparatus is complex in structure. Furthermore, divided members formed by stamping FRP sheets contain fibers even at the joining surfaces, which become short of fusible resin and tend to develop insufficient joining forces.

The present invention has been made in view of the aforesaid problems of the convetional automobile bumpers, the process of stamping FRP sheets, and the process of fusing together bumper beam and face as resin parts.

SUMMARY OF THE INVENTION

It is an object of the present invention to provide an automobile bumper of thermoplastic resin which is lightweight, highly rigid, and does not require another member for reinforcing a bumper beam.

Another object of the present invention is to provide a method of heating an FRP sheet highly efficiency so that a subsequent process of stamping a lamination of FRP sheets can be effected with increased production efficiency.

Still another object of the present invention is to provide a method of fusing thermoplastic resin parts such as bumper beam and face of an automble bumper while preventing foreign matter from being trapped in fused areas of the parts and allowing heaters to be used for a long period of time.

To achieve the above objects, there is provided an automobile bumper comprising an outer bumper face, a bumper beam joined to an inner surface of the bumper face for reinforcing the bumper face, the bumper beam being adapted to be mounted on an automobile body, the bumper face and the bumper beam comprising parts molded of thermoplastic resin, the bumper beam including at least two members of thermoplastic resin having joining surfaces to be fused to each other, and flanges for forming beam flanges together when the members are fused to each other, the beam flanges being fused to an inner surface of the bumper face.

There is also provided a method of heating an FRP sheet to be stamped. comprising the step of continuously heating the FRP sheet in an atmosphere having a temperature successively lowered from a temperature higher than a resin melting temperature at which a resin of the FRP sheet is melted so that the entire FRP sheet is increased through successive heating stages to a temperature between the resin melting temperature and a resin degradation temperature at which the resin of the FRP sheet is degraded.

There is also provided a method of fusing at least two parts of thermoplastic resin to each other, comprising the steps of bringing heaters into close proximity with joining surfaces to be fused of the parts with a prescribed spacing therebetween for melting the joining surfaces, and pressing the melted joining surfaces against each other to fuse the parts together. At least one of the at least two parts comprises an FRP product made of glass fibers reinforced with a thermoplastic resin, the joining surfaces of the FRP product having a plurality of projections containing the thermoplastic resin only, the projections being melted when the parts are fused together.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a perspective view of a bumper face of thermoplastic resin and a bumper beam of thermoplastic resin according to the present invention, before they are fused together;

FIGS. 2 through 4 are views explaining a heating method for stamping one of two members of the bumper beam, FIG. 2 illustrates a device for heating an FRP sheet, FIG. 3 is a graph of temperatures of the FRP sheet in respective steps of operation of the heating device, FIG. 4 schematically illustrates steps of the heating process;

FIG. 5 is a graph of temperatures of an FRP sheet in various steps of a heating method according to another embodiment of the present invention;

FIGS. 6 and 7 are enlarged plan and fragmentary cross-sectional views of a fused surface of the FRP bumper beam;

FIG. 14 is a cross-sectional view of a heater in the fusing apparatus;

FIG. 15 is a cross-sectional view of an automobile bumper according to another embodiment of the present invention;

FIG. 16 is an exploded cross-sectional view of a bumber beam of the bumper shown in FIG. 15;

FIG. 23 is a side elevational view of the fusing apparatus;

FIG. 24 is a plan view of the fusing apparatus;

FIGS. 25A through 25D are views showing a process of clamping the bumper face;

FIG. 28 is a graph showing temperatures of an FRP sheet in various steps of a conventional heating method.

DETAILED DESCRIPTION OF THE PREFERRED EMBODIMENTS

Figure 8:
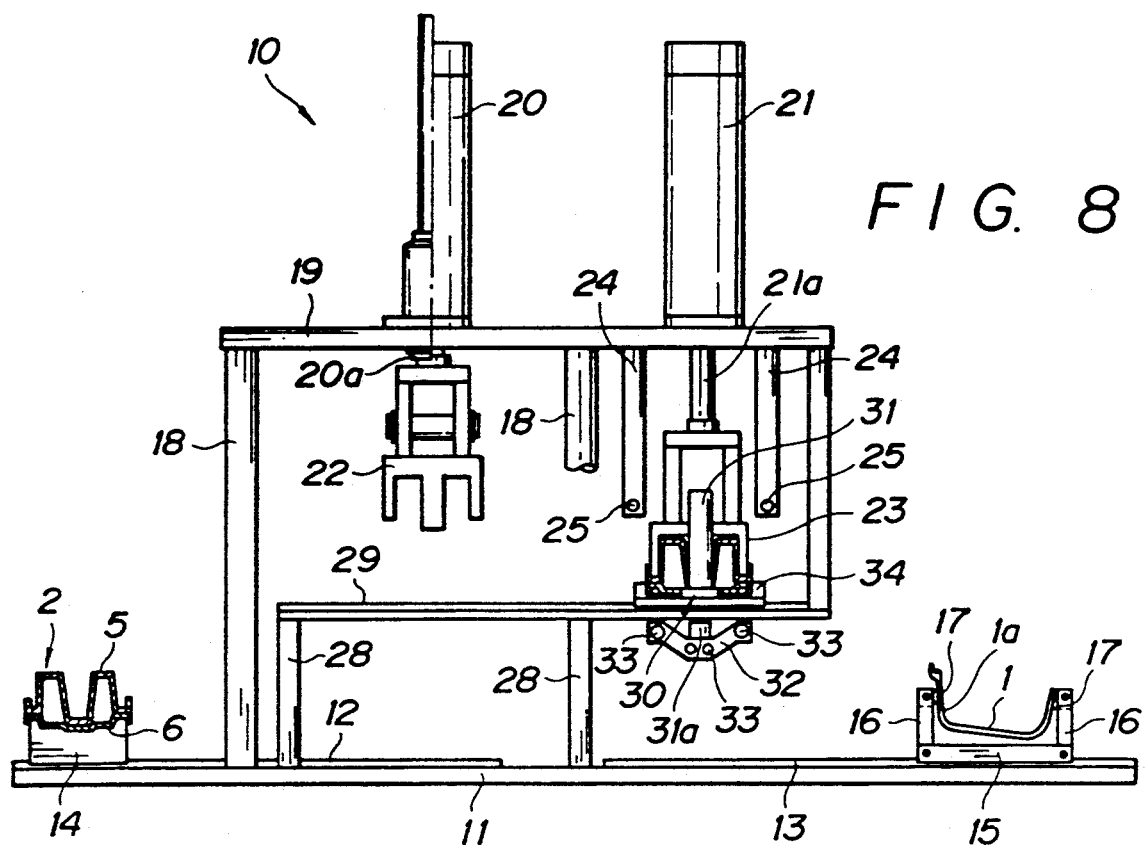
FIGS. 8 through 13 are elevational views of an apparatus according to the present invention for fusing the bumper face and beam shown in FIG. 1, the views showing successive steps of operation of the apparatus.

The bumper beam and face of a front automobile bumper will hereinafter be described as thermoplastic resin parts or components.

As shown in FIG. 1, a front automobile bumper 50 comprises an outer bumper face 1 and an inner bumper beam 2 joined to an inner surface of the bumper face 1 to reinforce the same. The bumper beam 2 is thermally fused to the inner surface of the bumper face 1 by a method described later on. The bumper face 1 is formed by injecting molding thermoplastic resin such as polyethylene or polypropylene, for example. The bumper beam 2 is formed by stamping glass fiber reinforced resin or plastic (FRP). The bumper face 1 has a grille 3 in its front lower portion and opposite side ends 4 directed backwards at a substantially right angle. The bumper beam 2 comprises two members or parts 5, 6. The member 5 has a cross-sectional shape including upper and lower shallow channels and a single, relatively deep central channel. The member 6 has a cross-sectional shape having a wide central channel. Flat front surfaces 5a, 5b of the upper and lower channels and a flat front surface 5c of the central channel of the member 5 are thermally fused to corresponding flat rear surfaces 6a, 6b, 6c of the member 6 by a method described later. The bumper beam 2 is constructed of the members 5, 6 thus thermally fused together. With the members 5, 6 fused together, upper and lower flanges 5d, 5e of the member 5 lie flush with upper and lower flanges 6d, 6e, respectively, of the member 6, jointly forming upper and lower flat flanges 2a, 2b of the bumper beam 2. The flanges 2a, 2b are thermally fused to a rear surface 1a of the bumper face 1, thus completing the bumper 50.

The member 5 of the bumper beam 2 is formed in the following manner (since the member 6 is also formed in the same manner, it will not be described in detail):

FIG. 2 schematically shows a heating device in which a plurality of FRP sheets 5i are placed on a feeder comprising wire ropes 8 kept taut in a heating furnace 7 (FIG. 4). Each of the FRP sheets 5i has a prescribed width and a prescribed length. The FRP sheet 5i comprises glass fibers impregnated with thermoplastic resin such as polypropylene or polyethylene, for example, and has a thickness ranging from 2 to 4 mm. Heaters 7a, 7b for producing infrared rays are disposed in the heating furnace 7 above and below the resin sheets 5i in spaced relation thereto for heating the sheets 5i between the heaters 7a, 7b. When the sheets 5i are heated, the surface layers and inner areas thereof are substantially uniformly melted. Thereafter, the sheets 5i are stacked into a lamination, placed in dies, and stamped into the beam member 5.

The resin sheets 5i are heated in a plurality of regions, i.e., three zones or stages Z1, Z2, Z3.

FIG. 3 shows the relationship between heating time t and resin temperature Tp, the heating time being divided into three zones Z1, Z2, Z3. FIG. 5 schematically shows such a three-step heating process. Denoted at Td in FIG. 3 is a resin degradation temperature and Tm a resin melting temperature.

The resin sheets 5i are fed stepwise by the feeder mechanism 8 from a standby position Z0 into the heating furnace 7 in which the sheets 5i are placed in the quick heating zone Z1.

In the first zone Z1, the resin sheets 5i are quickly heated for about 40 seconds in an atmosphere at a temperature of about 400° C. As a result, the surface layer temperature Ts of the resin sheets 5i is rapidly increased as shown in FIG. 3 at a rate higher than the conventional rate. The temperature Ti of the inner area of the resin sheets 5i is also quickly increased at a rate lower than that of the surface layer temperature Ts. The heating in the intensive heaing zone Z1 is finished before the temperatures Ts, Ti reach the resin melting temperature Tm.

The sheets 5i are then fed stepwise into the second medium heating zone Z2, in which they are heated in an atmosphere at about 300° C. or more specifically at 320° C. in this embodiment continuously for 40 seconds, for example. The surface layer temperature Ts of the sheet 5i exceeds the melting temperature Tm, but the inside temperature Ti does not reach the melting temperature Tm though it is higher than the conventional inside temperature, as shown in FIG. 3. The heating in the medium heating zone Z2 is finished before the surface layer temperature Ts reaches the degradation temperature Td.

Thereafter, the sheets 5i are fed stepwise into the third less intensive heating zone Z3, in which they are heated in an atmosphere at about 250° C. slightly lower than the degradation temperature Td continuously for 40 seconds, for example. The surface layer temperature Ts of the sheet 5i keeps above the melting temperature Tm, and the inside temperature Ti exceeds the melting temperature Tm.

In the above heating process, the surface layer and inside area of each of the resin sheets 5i are melted. The sheets 5i are stacked in a zone Z4 as shown in FIG. 4, and then placed into dies by which they are stamped into the member 5. Although three sheets 5i are shown as being stacked, the number of stacked sheets may be varied dependent on the member into which the sheets are to be stamped. The total heating time is 2 minutes, which is about half the conventional heating time of 4 minutes and 30 seconds as shown in FIG. 28.

The resin sheets 5i are continuously heated in atmospheres of temperatures successively lower than a temperature (400° C.) lower than the resin melting temperature Tm (about 180° C.) Thus, the heating time is much shorter than the heating time of the conventional method as shown in FIG. 28 by which a sheet is heated in a single atmosphere at a relatively low temperature. The efficiency of the heating process is increased, and so is the production efficiency of the process of stamping the stacked sheets.

While the sheets 5i are heated separately in the three zones Z1, Z2, Z3, they may be heated in two zones. FIG. 5 shows the relationship between the sheet heating time t and the sheet temperature Tp according to such a modification. In this modification, the sheets 5i are heated for about 50 seconds in an atmosphere at about 400° C. in an intensive heating zone Z1′. Then, the sheets 5i are heated for about 70 seconds in an atmosphere at about 250° C. in a less intensive zone Z3′. The surface layers and inner areas of the sheets 5i are substantially uniformly heated in the total time of 2 minutes. The same advantages as those of the heating process using the three zones Z1-Z3 are offered by the modified heating process.

When the members 5, 6 are stamped, their surfaces 5a, 5c, 5b and 6a, 6c, 6b to be fused are provided with a number of projections, and the flat surfaces 5d, 5e and 6d, 6e of the members 5, 6 which jointly form the surfaces 2a, 2b of the bumper beam 2 to be fused to bumper face 1 are also provided with a number of projections, in the manner described below. FIGS. 6 and 7 show, by way of example, the fusing surface 5a of the member 5 of the bumper beam 2, which has a number of projections formed thereon. As shown in FIG. 7, the member 5 is formed by impregnating glass fibers F with resin P.

A number of projections 5j are formed on the fusing surface 5a of the member 5. The projections 5j do not contain fibers F but contain only resin P. As illustrated in FIG. 6, the projections 5j are formed in a mosaic pattern with grooves 5k defined therebetween. As shown in FIG. 7, each of the projections 5j has a width w1 shorter then the fibers F, the width wl being in the range of from 3 to 10 mm. Each of the grooves 5k has a width s1 smaller than the thickness of the fibers F, the width s1 ranging from 0.5 to 1.0 mm. Thus, the fibers F are prevented from entering or being exposed in the grooves 5k. The height h1 of the projections 5j, and hence the depth of the grooves 5k are in the range of 0.5 to 1.0 mm so that a sufficient fused layer is formed when the sheet is fused.

A method of thermally fusing the bumper beam 2 and the bumper face 1 as divided components of thermoplastic resin, and an apparatus for carrying out such a method will be described with reference to FIGS. 8 through 13.

As shown in FIG. 8, a fusing apparatus generally designated by the reference numeral 10 has a base 11 on which laterally spaced rails 12, 13 are mounted. The rails 12 support thereon a first movable carriage 14 on which the beam members 5, 6, not yet joined, are placed, the first movable carriage 14 being movable on the rails 12. The rails 13 support thereon a second movable carriage 15 on which the bumper face 1 is placed, the second movable carriage 15 being movable on the rails 13. The second movable carriage 15 has a plurality of laterally swingable arms 16 having respective vacuum pads 17 disposed on the inner sides of their upper ends for fixing the bumper face 1 under suction. The second movable carriage 15 moves on the rails 13 with the bumper face 1 fixedly positioned by the vacuum pads 17.

On the base 11, there are vertically disposed a plurality of posts 18 positioned out of interference with the path of movement of the first movable carriage 14 supporting the beam 2 thereon and also out of interference with rails 29, described later. A support plate 19 is attached to the upper ends of the posts 18 and supports thereon a first cylinder unit 20 and a second cylinder unit 21. The first and second cylinder units 20, 21 serve as first and second lifting devices, respectively. The first cylinder unit 20 has a rod 20a contractably extending downwardly and supporting a first clamp 22 on its lower end. The second cylinder unit 21 has a rod 21a contractably extending downwardly and supporting a second clamp 23 on its lower end. A plurality of arms 24 supporting a heater 25 between their lower ends depend from the support plate 19, the heater 25 extending in a direction normal to the sheet of FIG. 8. The arms 24 and the heater 25 are positioned out of interference with the path of vertical movement of the second clamp 23 caused by the second cylinder unit 21.

As shown in FIG. 14, the heater 25 comprises a tube 26 of quartz having substantially the same longitudinal dimension as those of the beam members 5, 6, and a coiled electric heater wire 27 inserted in the tube 26. The tube 26 can be coupled to another tube and can flexibly be bent. The tube 26 may be made of metal. The heater wire 27 is preferably a Nichrome wire.

A plurality of posts 28 are vertically disposed on the base 11 outside of the rails 12, 13, the posts 28 being shorter than the posts 18. Laterally extending rails 29 are mounted on the upper ends of the posts 28, and mobile bodies 30 are movably mounted respectively on the rails 29. One of the mobile bodies 30 supports thereon a third cylinder unit 31 having a rod 31a contractably extending downwardly with an arm 32 attached to the lower end thereof. The rail 29, the mobile body 30, the cylinder unit 31, and the arm 32 constitute one assembly, and another identical assembly is positioned behind the illustrated assembly. Four heaters 33, which are identical in structure to the heater 25, extend between the arms 32 in a direction normal to the sheet of FIG. 3. A vertically swingable pallet 34 is attached between the mobile bodies 30 for supporting the bumper beam 2. The pallet 34 extends between the rails 29 and has a longitudinal dimension larger than that of the bumper beam 2. The heaters 33 have a longitudinal dimension that is substantially the same as that of the bumper face 1.

The process of thermally fusing the bumper beam 2 and the bumper face 1 together using the fusing apparatus 10 will be described below. The first movable base 14 and the second movable base 15 are driven at a prescribed sequence by a driver mechanism (not shown), and the cylinder units 20, 21, 31 are controlled at a prescribed sequence by a control mechanism (not shown). For the sake of brevity, these driver and control mechanisms will not be described in detail as they have no direct bearing on the present invention. The first clamp 22, the second clamp 23, and the arm 32 are vertically moved by extension and contraction of the first, second, and third cylinder units 20, 21, 31, respectively. Therefore, operation of the cylinder units 20, 21, 31 will not be described.

(A) First, the members 5, 6 which are not yet joined are set on the first movable base 14 in a stacked condition, as shown in FIG. 8. Then, the first movable base 14 is moved to the right (FIG. 8) and then stopped directly below the first clamp 22.

Figure 9:
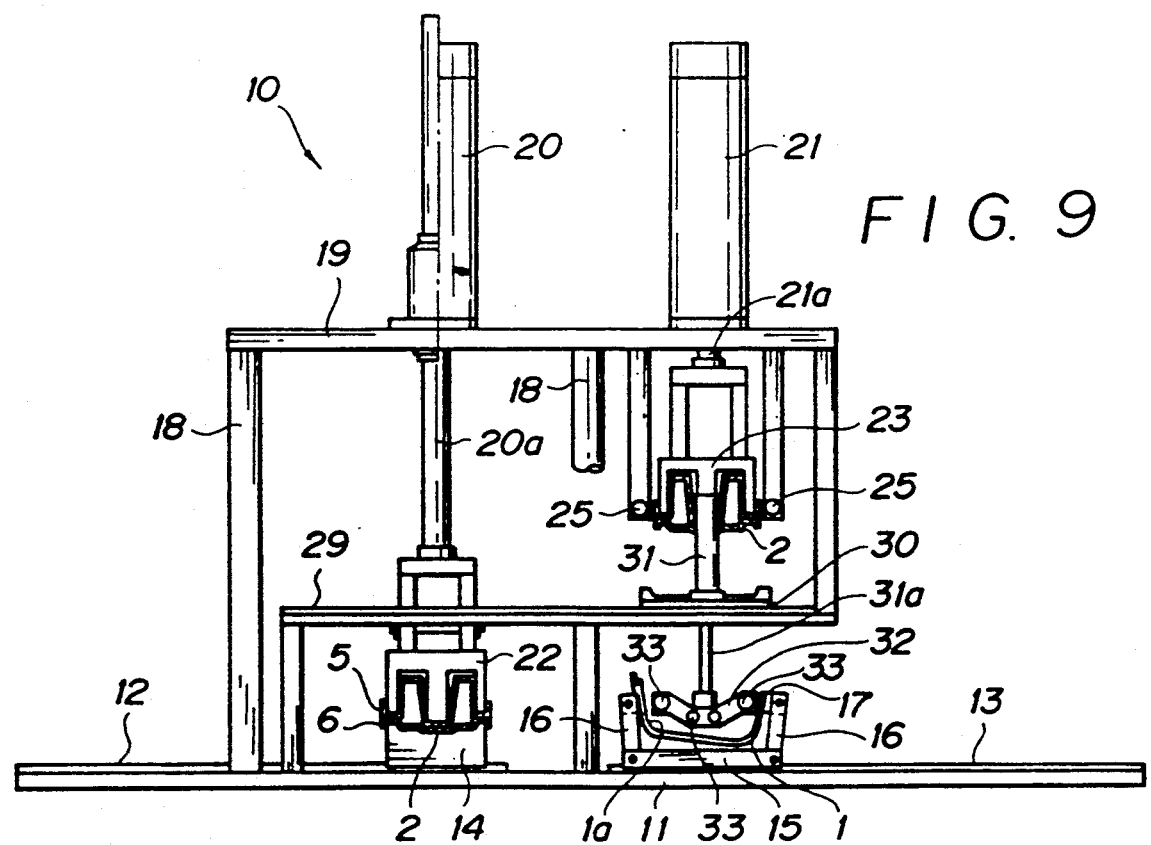

(B) Thereafter, the rod 20a of the first cylinder unit 20 is extended to lower the first clamp 22 to the position of FIG. 9. The clamp 22 engages in the three channels of the member 5 of the bumper beam 2 to grip the member 5. The rod 20a is then contracted to lift the first clamp 22 and hence the member 5 therewith.

Figure 10:
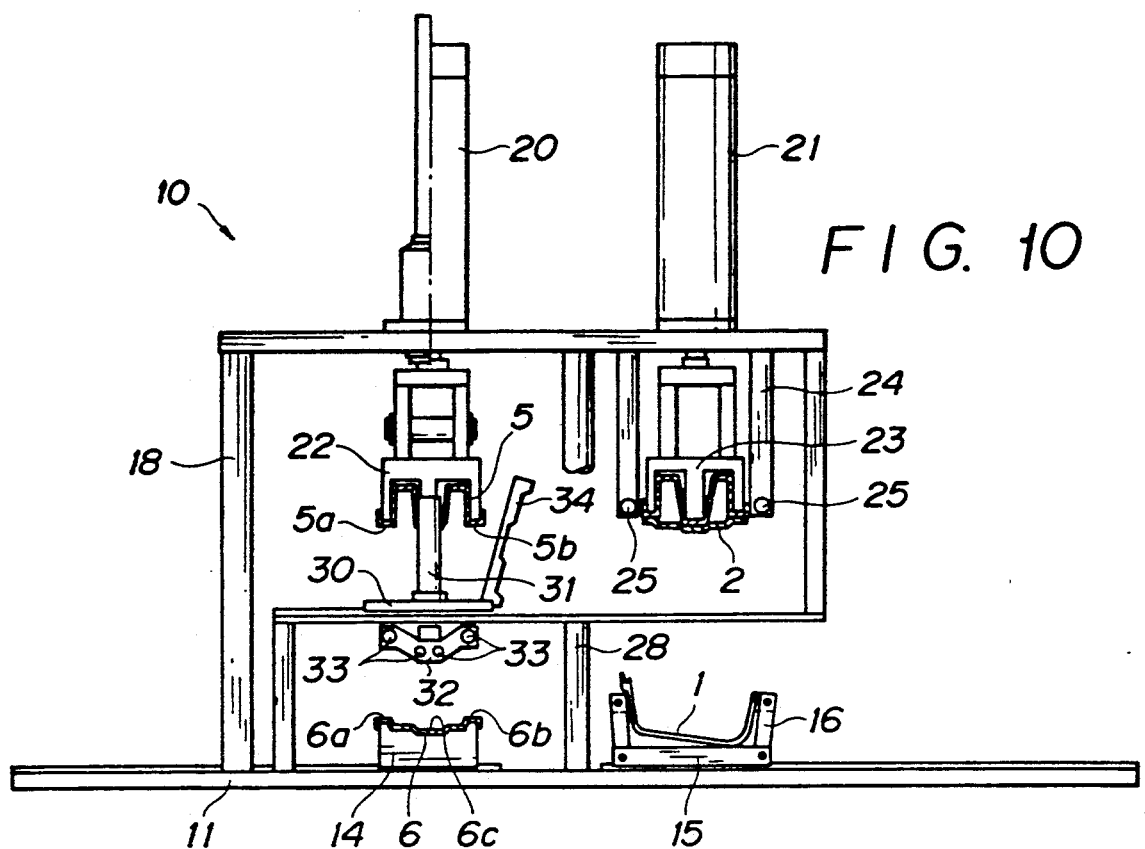

(C) The mobile bodies 30 are moved to the left and stopped in a position between the members 5, 6, as shown in FIG. 10. Before the mobile bodies 30 are moved, the rod 31a has been contracted to lift the arm 32 and the pallets 34 have been swung upwardly.

Figure 11:
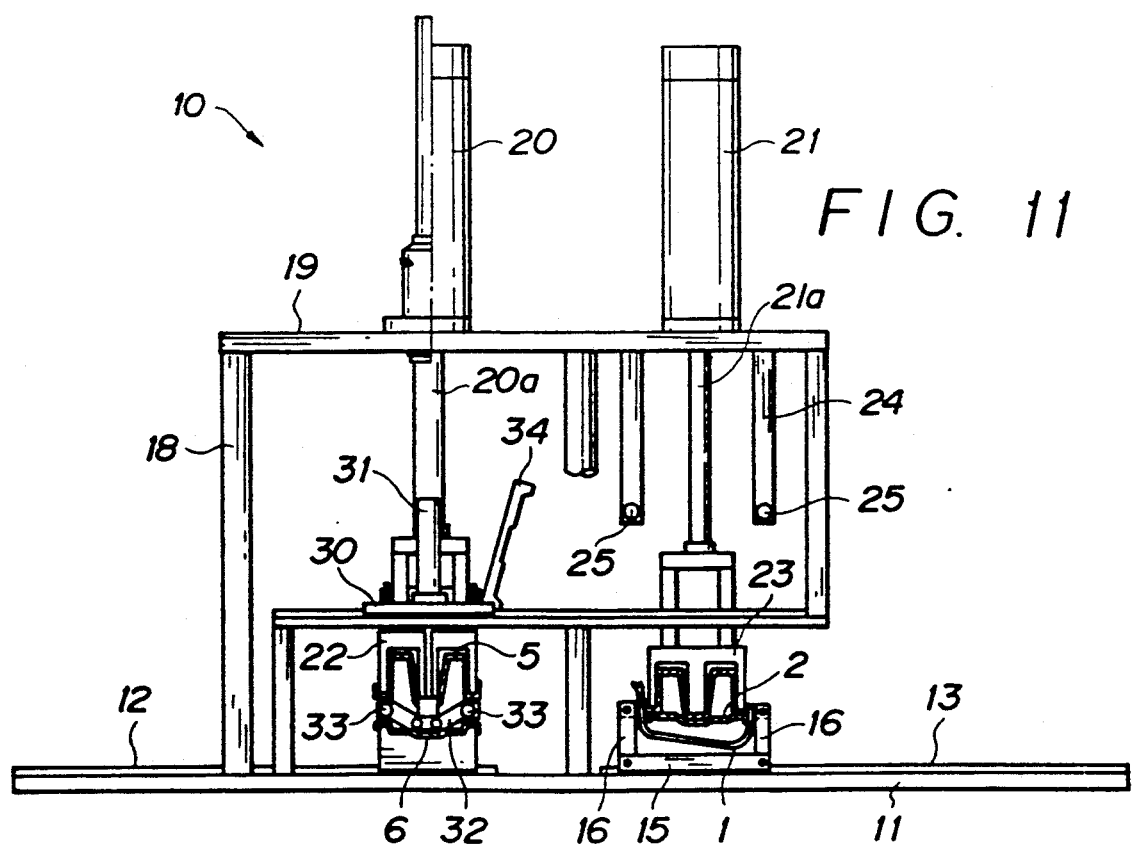

(D) Then, the first cylinder unit 20 and the third cylinder units 31 are extended to lower the member 5 and the arm 32 to the position of FIG. 11. The heaters 33 are now positioned between the flat surfaces 5a, 5b, 5c of the member 5 and the flat surfaces 6a, 6b, 6c of the member 6. The heaters 33 and the flat surfaces 5a, 5b, 5c and 6a, 6b, 6c are preferably spaced a distance ranging from 5 to 15 mm, and the heaters 33 are preferably heated to a temperature ranging from 500° to 600° C. The flat surfaces 5a, 5b, 5c, 6a, 6b, 6c are melted by infrared rays emitted from the heaters 33. Since the flat surfaces have projections, as described above, they are well melted at an increased rate.

Figure 12:
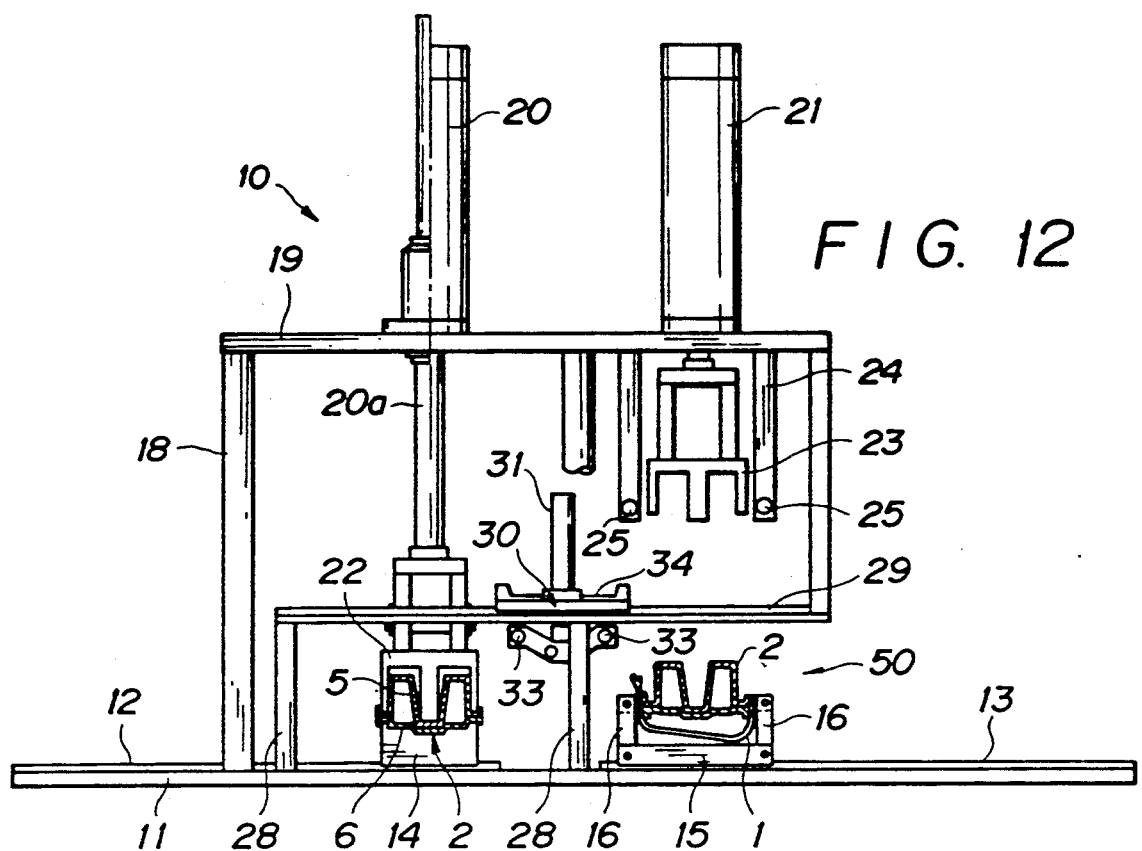

(E) Subsequently, the first clamp 22 and the arm 32 are elevated, and then the mobile bodies 30 are moved to the right to displace the arm 32 out of the space between the members 5, 6. Immediately thereafter, the member 5 with the lower flat surfaces 5a, 5b, 5c melted is lowered into contact with the melted upper surfaces 6a, 6b, 6c of the member 6, as shown in FIG. 12. The member 5 is pressed against the member 6 by the first cylinder unit 20. The members 5, 6 are integrally fused to each other into a bumper beam 2. The pallets 34 are closed right after the mobile bodies 30 are moved rightwardly.

Figure 13:
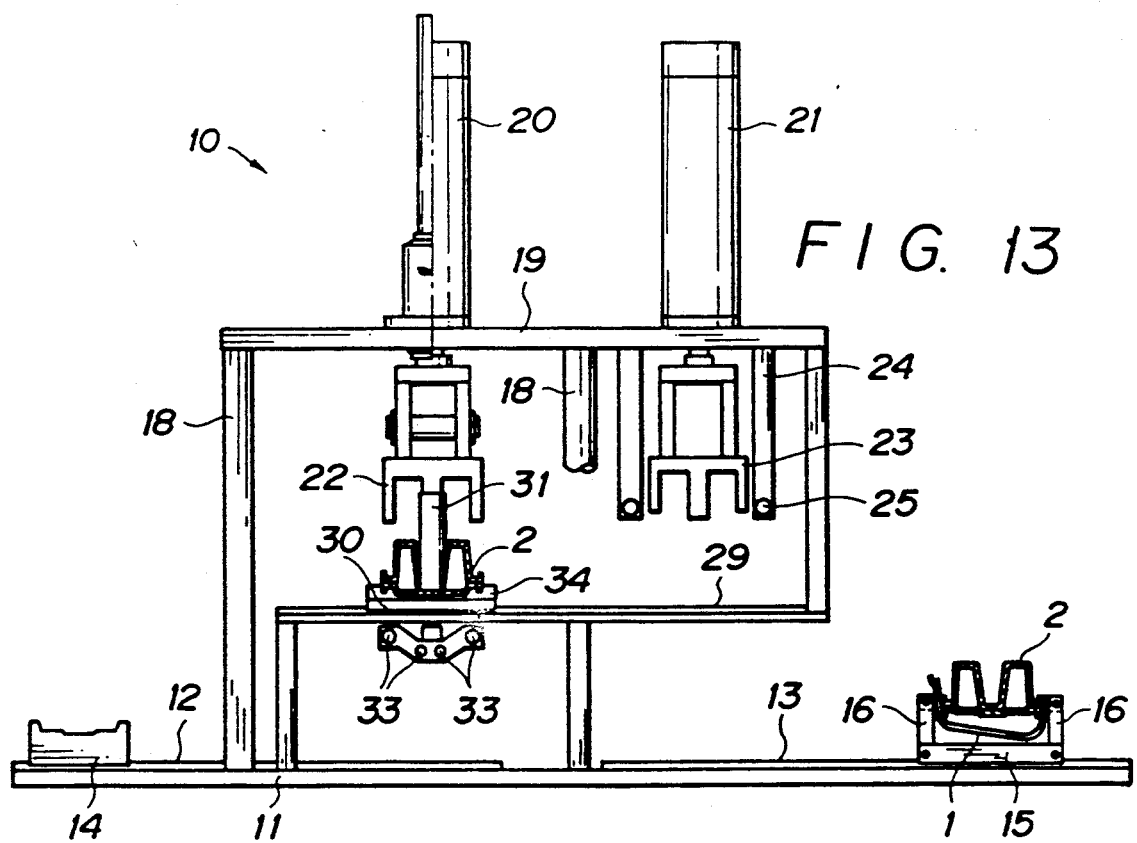

(F) In the position of FIG. 12, the completed beam 2 is still gripped by the first clamp 22. The first clamp 22 and the bumper beam 2 gripped thereby are lifted above the mobile bodies 30, which are then moved to a position directly below the first clamp 22, i.e., the bumper beam 2. Then, the bumper beam 2 is lowered onto the pallets 34 of the mobile bodies 30. The bumper beam 2 is released from the first clamp 22 and placed on the pallets 4. Thereafter, the first clamp 22 is elavated, as shown in FIG. 13.

(G) The mobile bodies 30 is moved to a position directly below the second clamp 23, which is then caused to descend to grip the bumper beam 2, as illustrated in FIG. 8. Prior to this, the bumper face 1 has been set on the second movable base 15. The second clamp 22 is lifted until the flat flanges 2a, 2b of the bumper beam 2 are positioned near the heaters 25 on the lower end of the arms 24. The flat flanges 2a, 2b and the heaters 25 are spaced 5 to 15 mm from each other. Simultaneously, the second movable base 15 is moved to the left until the bumper face 1 is positioned directly beneath the arm 32. The arm 32 is lowered to bring the heaters 33 into confronting relation to the inner surface 1a of the bumper face 1. At this time, the arms 16 are spread laterally to keep the heaters 33 and the inner surface 1a of the bumper face 1 spaced apart 5 to 15 mm from each other, as shown in FIG. 9.

(H) In the position of FIG. 9, the heaters 25, 33 are energized to melt the flat surfaces 2a, 2b of the bumper beam 2 and the inner surface 1a of the bumper face 1. During this melting period, the members 5, 6 of a next bumper beam 2 are moved to the position below the first clamp 22 by the first movable base 14, and gripped by the first clamp 22, as described above.

(I) After the flat surfaces 2a, 2b and the inner surface 1a have been melted, the arm 32 is lifted, and the mobile bodies 30 are moved to the left. Therefore, the pallets 34 and the arm 32 are displaced out of the space between the bumper beam 2 and the bumper face 1 and into the position between the next members 5, 6, as shown in FIG. 10.

(J) Then, the second clamp 23 is lowered to position the bumper beam 2 inside of the bumper face 1. The arms 16 are moved toward each other to bring the inner surface 1a of the bumper face 1 against the flat surfaces 2a, 2b of the bumper beam 2, as illustrated in FIG. 11. The bumper face 1 is pressed against the bumper beam 2, thus completing a bumper 50.

(K) Thereafter, the second clamp 23 is released out of engagement with the bumper 50 and lifted to the position of FIG. 12.

(L) The second movable base 15 is moved to the right as shown in FIG. 13. The bumper 50 is then dismounted from the second movable base 15, which will thereafter be supplied with a next bumper face 1.

The above process steps (G) through (L) are carried out simultaneously with the process steps (A) through (F).

Since the bumper beam 2 and the bumper face 1 are made of thermoplastic resin, the bumper 50 is highly rigid and lightweight. The rigidity of the bumper 50 is high because the bumper beam 2 is constructed of the two FRP members 5, 6 fused integrally together, and also because the central surface 5c and side surfaces 5a, 5b of the member 5 respectively to the central surface 6c and side surfaces 6a, 6b of the other member 6 and the flanges 2a, 2b of the members 5, 6 are fused to the inner surface 1a of the bumper face 1.

The heaters 33 are spaced 5 to 15 mm from the surfaces 5a, 5b, 5c and 6a, 6b, 6c of the members 5, 6 when they are melted in the step (D). Therefore, melted resin is not attached to the heaters 33 and no foreign matter is trapped in the melted surfaces of the members 5, 6. Therefore, it is not necessary to coat the surfaces of the heaters 33 with Teflon, and the heaters 33 can be used for a long period of time. As a result, automobile bumpers 50 can successively be manufactured with high efficiency. Likewise, the heaters 25, 33 are spaced similarly from the surfaces 2a, 2b, 1a of the bumper beam 2 and the bumper face 1 when they are melted in the step (H), resulting in the same advantages as described above.

The joining surfaces 5a, 5b, 5c and 6a, 6b, 6c of the members 5, 6 of the bumper beam 2 are melted commonly by one set of heaters 33. Therefore, the number of heaters for melting these joining surfaces is reduced. Since these heaters 33 are also used to melt the inner surface 1a of the bumper face 1, the number of the heaters in the heating apparatus 10 is reduced. As a consequence, the number of parts of the heating apparatus 10 is reduced, making the heating apparatus 10 compact.

The joining surfaces 5a, 5b, 5c and 6a, 6b, 6c for the members 5, 6 of the bumper beam 2, the joining surfaces 5d, 6d (i.e., 2a), and the joining surfaces 6e, 6e (i.e., 2e) have a plurality of projections containing only resin P, as shown in FIGS. 6 and 7. Therefore, these joining surfaces contain a necessary and sufficient amount of resin when they are fused together, and can be fused with a sufficient bonding strength.

In the above embodiment, the front automobile bumper 50 is made of thermoplastic resin. However, the present invention is also applicable to a rear automobile bumper. While the bumper beam 2 and the bumper face 1 are thermally fused together in the illustrated embodiment, any other parts made of thermoplastic resin can be thermally fused by the method of the present invention.

A method of fusing parts of thermoplastic resin according to another embodiment of the present invention will be described with reference to FIGS. 15 through 21.

A bumper beam 152 of an automobile bumper 150 made of thermoplastic resin as shown in FIG. 15 will be described by way of example as a thermoplastic resin part or member. The automobile bumper 150 comprises a bumper face 151 and the bumper beam 152, which are elongate members of thermoplastic resin. The bumper face 151 has a body 151d of an inverted channel shape including an upper portion 151a, a front portion 151b, and a lower portion 151c. From the lower portion 151c, there extends a skirt 151e inclined rearwardly and downwardly and having air slits 151f. The bumper beam 152 comprises members 153, 154 of FRP, as shown in FIG. 6. The members 153, 154 have joining surfaces 153a, 153b and 154a, 154b, respectively, which are fused to each other. The members 153, 154 have flanges 153c, 153d and 154c, 154d, respectively, bent 90° from the outer edges of the joining surfaces 153a, 153b and 154a, 154b. These flanges 153c, 153d and 154c, 154d serve as fusing surfaces to be fused to the inner surface of the bumper face 151. Thus, the joining surfaces 153a, 154a and 153d, 154d of the members 153, 154, and the bent flanges 153c, 154c and 153d, 154d thereof jointly form joining portions of a T-shaped cross section of the bumper beam 152 which are to be joined to the bumper face 151. The bumper beam 152 is of a substantially box-shaped cross section for increased rigidity. Where the bumper beam 152 is constructed of a single molded member rather than the two members 153, 154, spaces U1, U2, U3 shown in FIG. 9 serving as undercuts.

FIGS. 17 through 21 show a method of fusing together the bumper beam members 153, 154 and an apparatus for carring out such a method.

Figure 17:
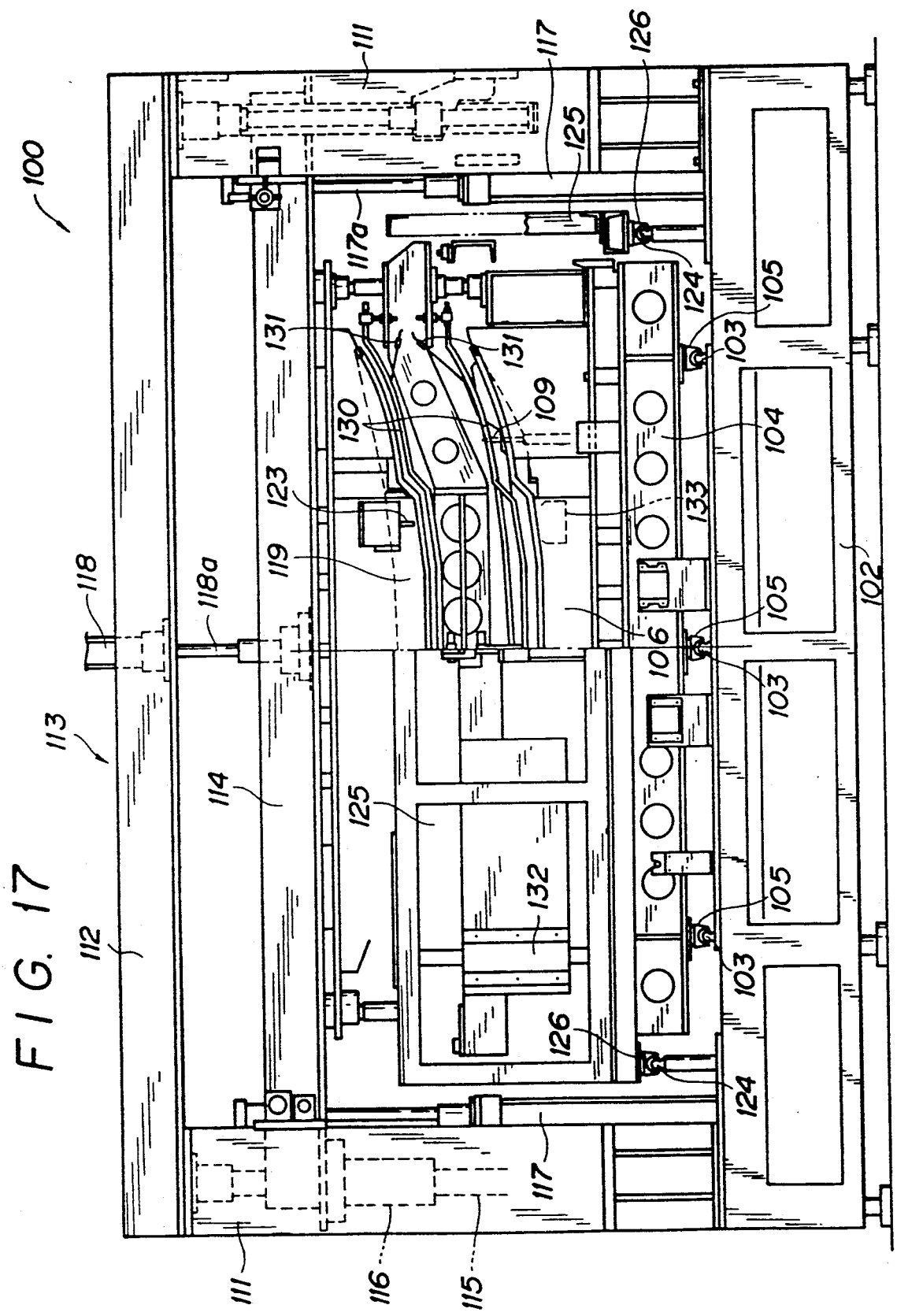
FIGS. 17 through 21 are elevational views of an apparatus according to the present invention for fusing together members of the bumper beam of FIG. 16, FIG. 17 being a front elevational view, partly in cross section, of the fusing apparatus, FIGS. 18 through 21 being side elevational views of the fusing apparatus showing the successive steps of operation thereof.

As shown in FIG. 17, a fusing apparatus 100 has base 102 on which there are mounted rails 103 extending in a back-and-forth direction normal to the sheet of FIG. 17. The rails 103 are shown as extending laterally in FIGS. 18 through 21. The righthand side of FIGS. 18 through 21 is a front side of the fusing apparatus 100, and the lefthand side is a rear side thereof. A support base 104 supporting a lower jig 106 is movably supported on the rails 103. On the support base 104, there are supported the members 153, 154 of the bumper beam 105 with the substantially L-shaped member 153 below the member 154. The lower member 153 is clamped on the lower jig 106. The jig 106 has vertical members 107, 108 spaced in the direction normal to the sheet of FIG. 17 and having upper edges 107a, 108a engaging the inner sides of the flanges 153c, 153d of the lower member 153. Therefore, slight deformation of the lower member 153 which may be introduced upon stamping is corrected by these jig members 107, 108. The vertical members 107, 108 have longitudinal shapes complementary to the normal shape of the lower member 153 and elongated in the lateral direction in FIG. 17. Positioning pins 109 which are laterally spaced from each other are disposed behind the front vertical member 108 of the lower jig 106. The positioning pins 109 serve to position the upper member 154 placed on the lower member 153 in the direction normal to the sheet of FIG. 17 for keeping the members 153, 154 relatively positioned while they are being fused to each other.

A shift cylinder 110 (FIG. 18) is disposed behind the support base 104 and has a rod 110a coupled to a rear portion of the support base 104. The support base 104 is movable back and forth by the rod 110a in response to operation of the shift cylinder 110.

Figure 18:
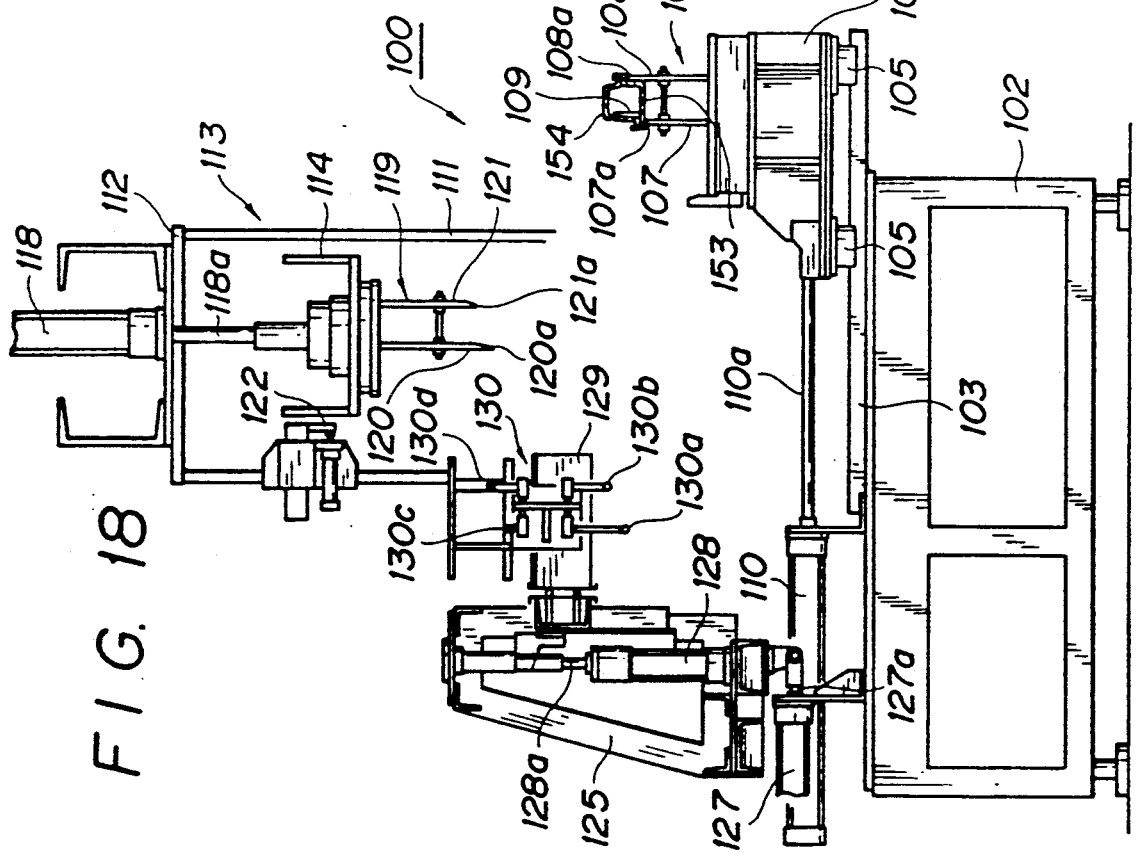

As illustrated in FIG. 17, an upper jig support frame 113 in the form of an inverted channel as viewed in front elevation comprises two vertical frame members 111 disposed one on each side of the base 102 and a horizontal frame member 112 interconnecting the upper ends of the vertical frame members 111. An upper jig support base 114 is vertically movably supported in the support frame 113. The support base 114 is vertically guided by guides 116 coupled to its opposite ends and slidably fitted over vertical guide posts 115. The opposite ends of the suport base 114 are coupled to rods 117a of pressure cylinders 117 vertically disposed on the lateral sides of the base 102. The center of the support base 114 is coupled to a rod 118a depending from a pressure cylinder 118 vertically mounted on the center of the horizontal frame member 112 of the support frame 113. The upper jig support base 114 supports an upper jig 119 having depending members 120, 121 spaced from each other in the direction normal to the sheet of FIG. 17. The members 120, 121 of the upper jig 119 are vertically longer and shorter, respectively, so that their lower ends 120a, 121a will engage the inner sides of the flanges 145c, 154d of the upper member 154. The members 120 which are complementary in shape to the normal shape of the upper member 154 extend laterally in FIG. 18. Denoted at 122 in FIG. 18 are hooks mounted on the vertical frame members 111 and engageable with the support base 114 for preventing the upper jig 119 from falling when the upper jig 119 is lifted and stored. Denoted at 123 in FIG. 47 is an auxiliary clamp jig for additionally clamping the upper beam member 154, and 133 an auxiliary clamp jig for additionally clamping the lower beam member 153.

Rails 124 extending in the direction normal to the sheet of FIG. 17 are positioned one on each side of the lower support jig base 104 on the base 102. Slide guides 126 on the lower ends of laterally spaced support frames 125 for a heater 130 (described later) are movable mounted on the rails 124, respectively. The support frame 125 is coupled to a rod 127a of a heater shifting cylinder 127 mounted on the base 102, so that the support frame 125 is bodily movable back and forth. A cylinder 128 (FIG. 18) for vertically moving the heater 130 is vertically mounted on the support frame 125 and has a rod 128a to which a heat support base 129 is coupled. The heater 130 is supported on the heater support base 129. As shown in FIG. 17, the heater 130 extends laterally beyond the length of the upper and lower beam members 153, 154 and includes four front and rear, upper and lower heater elements 130a, 130b, 130c, 130d extending along the front and rear joining surfaces 153a, 153b, 154a, 154b of the members 153, 154. Designated at 131 in FIG. 17 is a sensor for detecting the temperature of the heater elements 130a–103d, and 132 a guide mounted on the support frame 125 for vertically moving the heater 130.

A process of fusing the beam members 153, 154 to each other using the fusing apparatus 100 will be described below. The lower jig support base 104, the upper jig support base 114, and the heater support base 125 are driven at a prescribed sequence by the cylinders 110, 118, 127, 128 controlled by a control mechanism (not shown). Since the control mechanism is not closely related to the present invention, it will not be described below. In addition, operation of the cylinders 110, 118, 127, 128 will not be described below unless required.

(i) First, the members 153, 154 are set on the lower jig 106 as shown in FIG. 18. At this time, the upper jig 119 is in an elevated position. More specifically, the support base 104 is moved forwardly along the rails 103 to the rightmost set position. The worker then goes in front of the lower jig 106, i.e., rightwardly of the lower jig 106, to set the lower member 153 on the lower jig 106. Thereafter, the upper member 154 is placed on the lower member 153 so that the joining surfaces 153a, 153b, 154a, 154b face each other. The upper member 154 is positionally limited by the pin 109.

Figure 19:
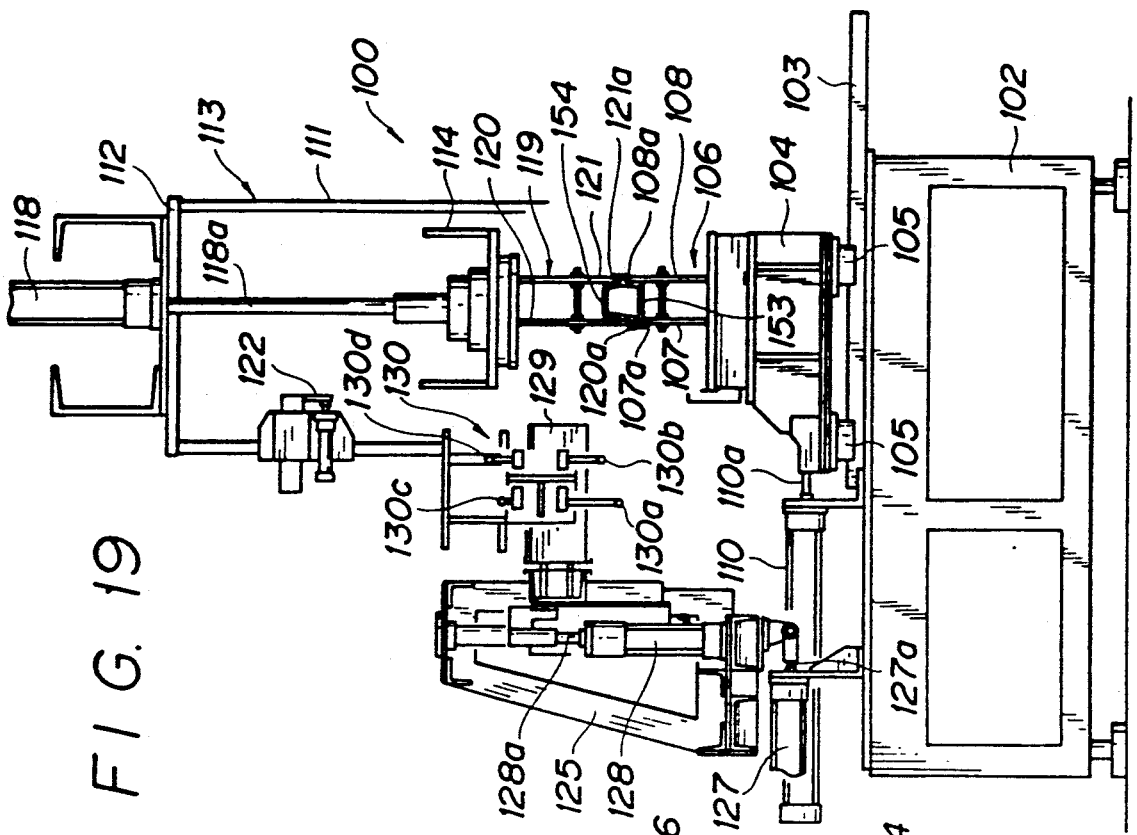

(ii) Then, the support base 104 is retracted on the rails 103 and stopped in the working position shown in FIG. 19. The rods 117a of the cylinders 117 are contracted, and the rod 118a of the cylinder 118 is extended to lower the upper jig support base 114 and hence the upper jig 119. Upon downward movement of the support base 114 to its lower limit, the members 153, 154 are gripped between the jigs 106, 119 and automatically clamped forcibly thereby. The lower ends 120a, 121a of the members 20, 121 of the upper jig 119 are brought into forced engagement with the inner sides of the flanges 154c, 154d of the upper member 154 placed on the lower member 153, as shown in FIG. 19. Even if the upper member 154 has slightly been deformed, it is forcibly corrected into its normal shape by the members 120, 121 of the jig 119. The member 154 is firmly held in position by the upper jig 119. The intermediate portion of the upper member 154 is held by the auxiliary clamping jig 123. The lower member 153 is depressed by downward forces from the upper member 154, so that the upper ends 107a, 108a of the members 107, 108 of the lower jig 106 forcibly engage the inner surfaces of the flanges 153c, 153d of the lower member 153. Therefore, any slight deformation of the lower member 153 is forcibly corrected by the configuration of the members 107, 108 of the lower jig 106.

Figure 20:
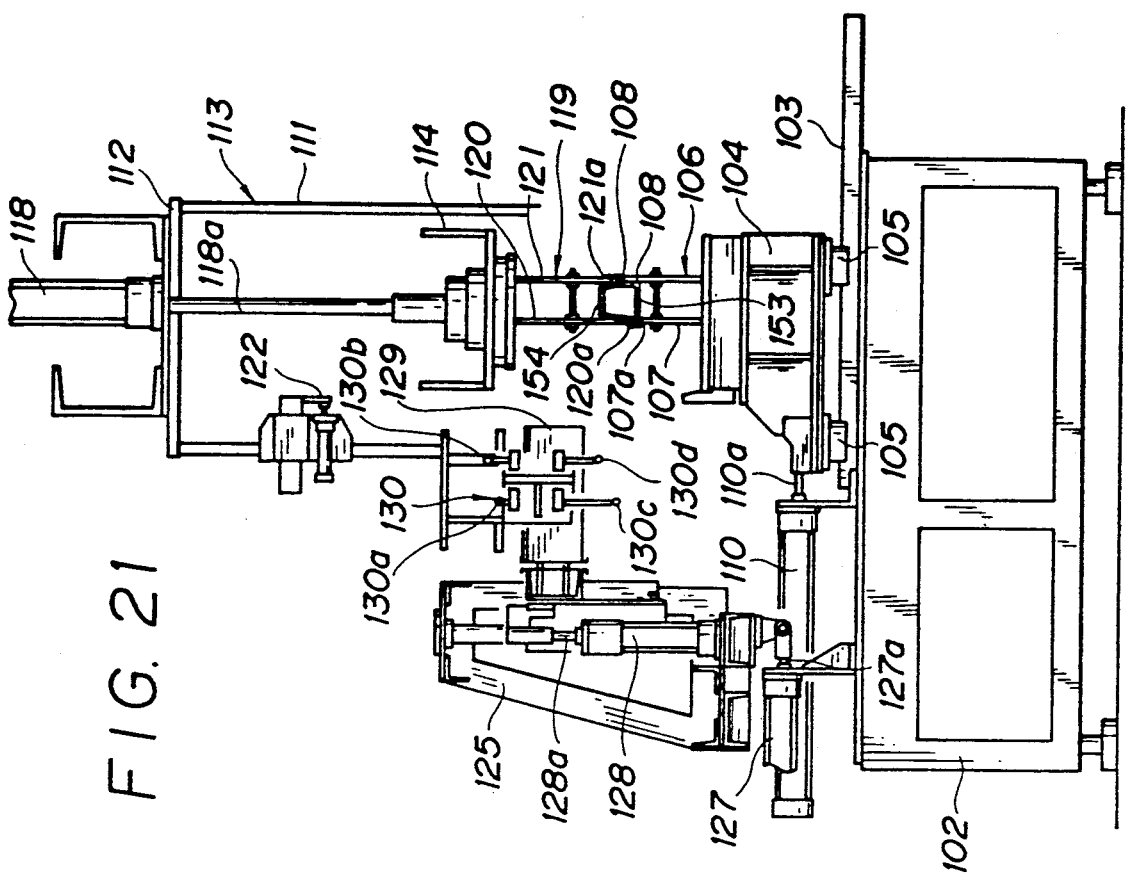

(iii) Thereafter, the upper jig 119 holding the upper member 154 is lifted to move the upper and lower members 154, 153 relatively away from each other in the vertical direction. The heater 130 which has been in a standby position is positioned between the upper and lower members 154, 153 in response to forward movement of the rod 127a of the cylinder 127. The lower member 153 has a step which cooperates with the bumper face 151 in defining a space for receiving head lights and other members. The heater 130 is lifted so that the lower heater elements 130a, 130b will not interfere with the step of the member 153. Thereafter, the heater 130 is moved forwardly by the cylinder 127 and then lowered into close proximity with the joining surfaces 153a, 153b of the lower member 153 with a spacing, which may range from 5 to 15 mm, left therebetween. Concurrent with this, the upper member 154 is elevated and then lowered to bring the joining surfaces 154a, 154b into confronting relation to the upper heater elements 130c, 130d of the heater 130 with a gap ranging from 5 to 15 mm therebetween. The heater 130 and the members 153, 154 are now positioned as shown in FIG. 20. In the position of FIG. 20, the heater elements 130a–130d of the heater 130 are energized to heat and melt the joining surfaces 154a, 154b, 153a, 153b of the members 154, 153.

Figure 21:
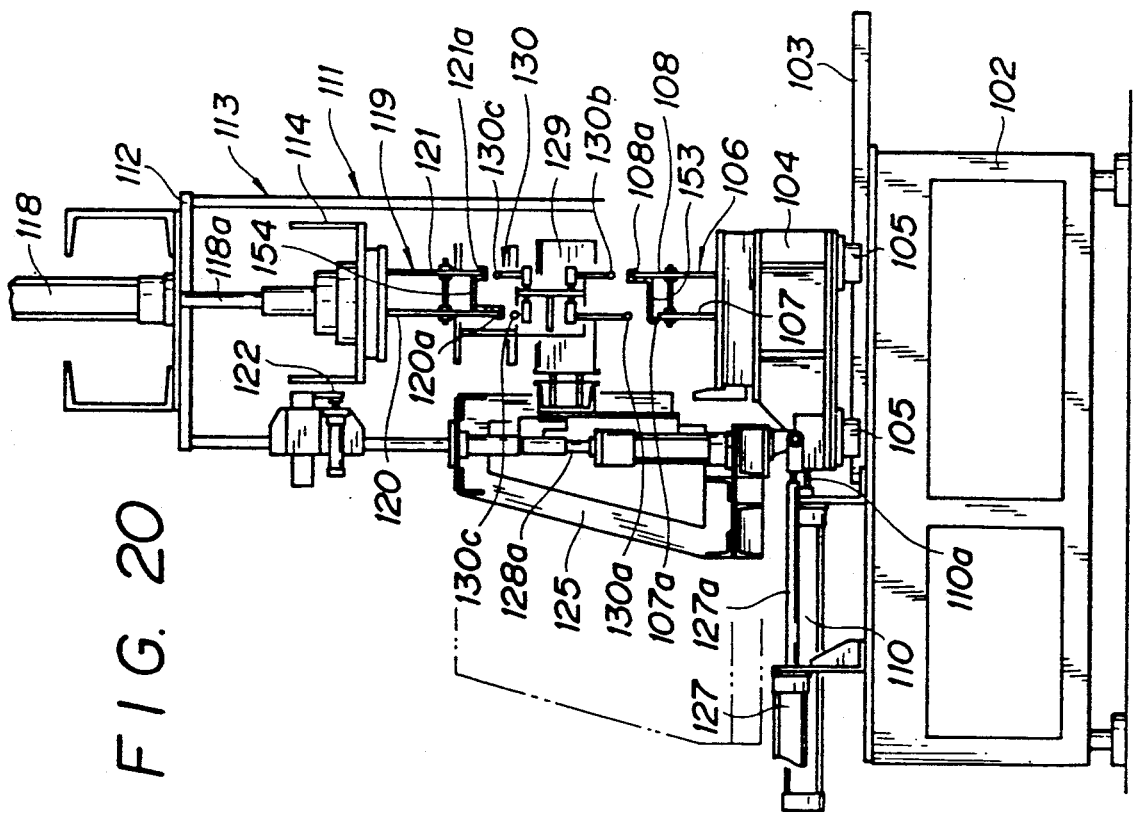

(iv) After the joining surfaces 154a, 154b, 153a, 153b of the members 154, 153 have been melted, the upper member 154 is elevated. The heater 130 is lifted and then retracted out of the position between the members 154, 153 which have been spaced vertically away from each other. Thereafter, the upper jig 119 is lowered to place the upper member 154 onto the lower member 153, so that the melted joining surfaces 154a, 154b, 153a, 153b are held against each other, as shown in FIG. 21. The cylinders 117, 118 are operated to press the upper and lower members 154, 153 to fuse the joining surfaces 153a, 153b, 154a, 154b under pressure. Unwanted deformation of the members 153, 154 is further forcibly corrrected by such pressurized fusing process.

(v) After the upper and lower members 154, 153 have been fused together into a bumper beam 152, the upper jig 119 is lifted, leaving the bumper beam 152 on the lower jig 106. Then, the lower jig 106 holding the bumper beam 152 thereon is moved forwardly, and the bumper beam 152 is removed.

In the above processing steps (i) through (v), the beam members 153, 154 of thermoplastic resin are fused together while they are being clamped by the upper and lower jigs 119, 106 which are complementary in shape to the normal shape of the members 153, 154. Therefore, slight deformation of the members 153, 154 are forcibly corrected by the shape of the jigs 119, 106. As a result, a product of a normal shape can be produced. Since the fusing process (i) through (v) can fully be automated, the fusing operation can be performed reliably within a short period of time, with the consequences that the required labor can be saved, the rate of production can be increased, the product quality can be improved, made uniform, and the cost can be lowered. By replacing the upper and lower jigs 119, 106 and the heater 130 with other jigs and heater, the fusing apparatus 100 can fuse resin members of other shapes and hence is versatile.

In the above embodiment, the members 154, 153 are fused while they are vertically placed one on the other. However, the members to be fused together may be positioned so as to be movable toward and away from each other laterally or back and forth, and the heater may be disposed between these members for heating and melting them.

A method of fusing the bumper beam 152 thus constructed to the bumper face 151 and an apparatus for carrying out such a method will be described below with reference to FIGS. 22 through 27.

Figure 22:
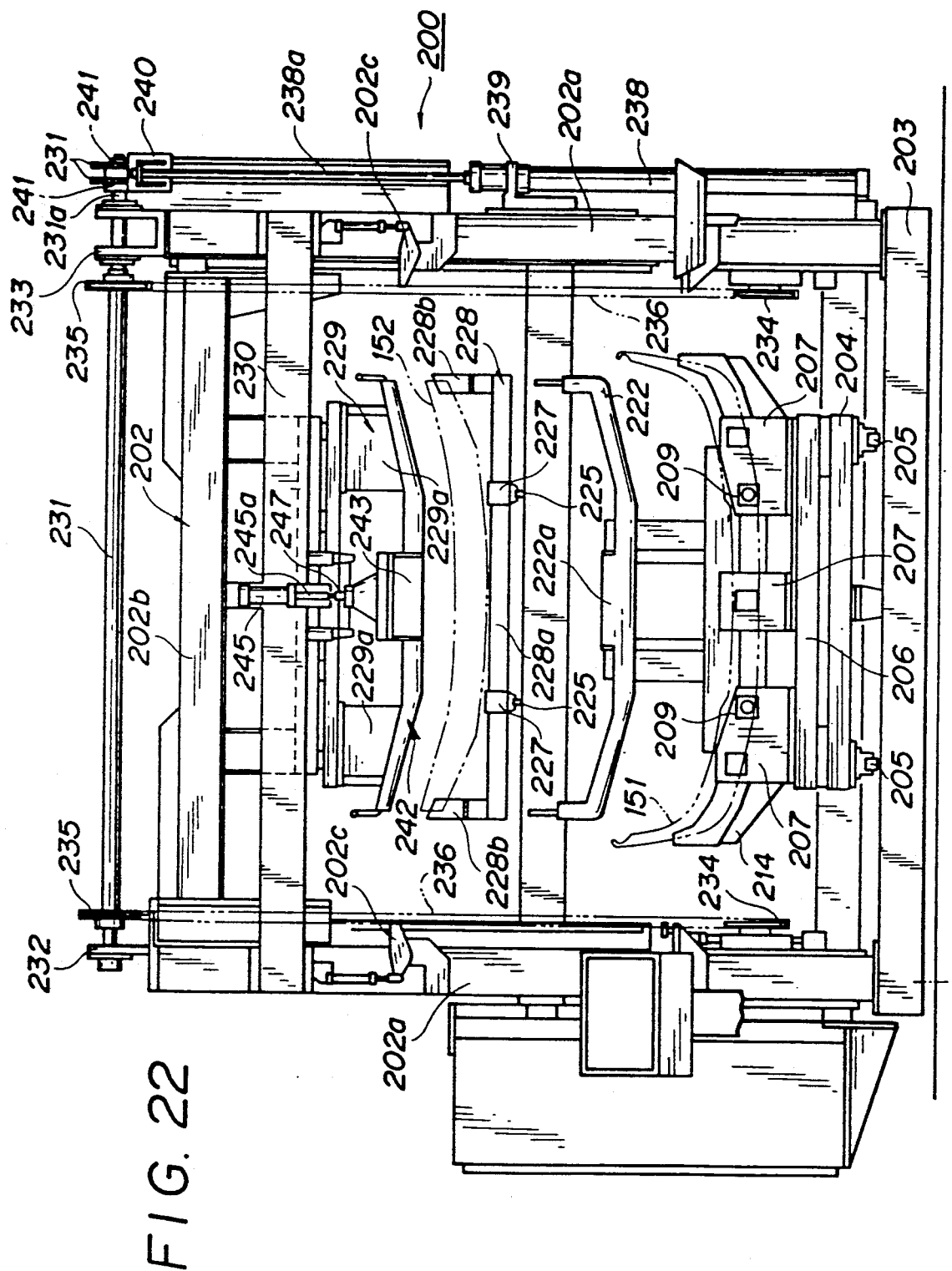
FIG. 22 is a front elevational view of the fusing apparatus.

As shown in FIG. 22, a fusing apparatus 200 has a base 203 supporting thereon a frame 202 comprising laterally spaced vertical frame members 202a, and a horizontal frame member 202b interconnecting the upper ends of the vertical frame members 202a.

The lefthand side of FIG. 23 is the front of the fusing apparatus 200 where the worker operates the apparatus. The frame 202 is vertically disposed on an intermediate portion of the base 202 in a direction normal to the sheet of FIG. 22. A bumper face fixing jig base 204 is mounted on a front portion of the base 203 below the frame 202. The jig base 204 is movably mounted on rails 205 mounted on the base 203 and extending in the direction normal to the sheet of FIG. 22. Support members 207, 208 are vertically mounted on an upper member 206 on the jig base 104 and spaced apart from each other in the direction normal to the sheet of FIG. 22. The front support member 207 supports a pressure cylinder 209 having a rod 209a to which there are coupled a member 210 for receiving the upper portion 151a of the bumper face 151 and a lifter cylinder 212 that supports a clamp cylinder 211 having a rod 211a with a clamp finger 213 on its Between the support members 207, 208, there is disposed a jig 214 for holding the body 151d of the bumper face 151. A pressure cylinder (not shown) supported on the rear support member 208 has a rod 215 projecting forwardly. The rod 215 supports on its distal end a vertically movable clamp finger 216 insertable in the air slits 151f of the skirt 151e of the bumper face 151.

The bumper face 151 can be set in place as shown in FIGS. 25A through 25D. As shown in FIG. 25A, the bumper face 151 is disposed on the jig 214 with the body 151d positioned downwardly. The upper end of the upper portion 151a is put on the tip end of the receiving member 210. Then, as shown in FIG. 25B, the clamp cylinder 211 is driven to extend the rod 211a to move the clamp finger 213 forwardly. The lifter cylinder 212 is driven to move the clamp cylinder 211 and the clamp finger 213 downwardly to the position of FIG. 25C. Then, the clamp cylinder 211 is actuated to retract the clamp finger 213 to clamp the upper end of the upper portion 151a against the tip end of the receiving member 210 as illustrated in FIG. 25D. Although not shown in FIGS. 25A through 25D, the clamp finger 216 (FIG. 23) is lifted when setting the bumper face 151 on the jig 214 to engage in the air slits 151f of the skirt 151e. As a result, the bumper face 151 is reliably set on the jig 214.

A support frame 217 is disposed behind and below the frame 202, and a cross member 217b extends horizontally between rear vertical frame members 217a of the support frame 217. On the cross member 217b, there is vertically supported a cylinder 218 by a bracket 219 for vertically moving a heater 222 for heating the bumper face 151. The cylinder 218 has a vertical rod 218a to which a support base 220 is attached. A cylinder 221 for moving a bumper face heater 222 back and forth is mounted on the support base 220, the cylinder 221 having an axis extending in the direction normal to the sheet of FIG. 22. The cylinder 221 has a rod 221a with its distal end supporting a holder 222a of the heater 222. As shown in FIG. 22, the heater 222 has a length which is substantially the same as that of the bumper face 151 set below the heater 222, and is shaped so that it is loosely fitted in the space between the upper and lower portions 151a, 151c of the bumper face 151. The heater 222 comprises two heater elements 222b spaced in the direction normal to the sheet of FIG. 22. In FIG. 23, the heater 222 is in an elevated position between the vertical frame members 202a of the frame 202.

A cylinder 223 for moving a feed base for the bumper beam 152 back and forth is mounted on a front portion 217c of the rear support frame 217, the cylinder 223 having an axis extending in the direction normal to the sheet of FIG. 22. The cylinder 223 has a rod 223a coupled to a slider 226 slidable back and forth on rails 225 on the front support frame portion 217c. From the slider 226, there extend forwardly two laterally spaced arms 227 having front ends between which a laterally extending channel-shaped feed base 228 for the bumper beam 152 is attached, shown in FIG. 22. The feed base 228 has a horizontal member 228a which is of substantially the same length as that of the bumper beam 152, and vertical members 228b mounted on the opposite ends, respectively, of the horizontal member 228a. The bumper beam 152 is set on the feed base 228 by the worker such that its opposite ends are supported on the vertical members 228b and its intermediate portion are supported on the horizontal member 228a.

A jig 229 (FIG. 22) for fixing the bumper beam 152 is disposed between the vertical frame members 202a of the frame 202 and has laterally spaced holders 229a for holding the bumper beam 152 at its laterally spaced openings (not shown) defined in the upper member. The jig 229 has a vertically movable base 230 horizontally supported between upper portions of the vertical frame members 202a. Sprockets 234 are rotatably mounted on lower inner surfaces of the vertical frame members 202a. A drive shaft 231 is rotatably supported on the frame 202 by bearing bases 232, 233 and supports sprockets 235 on its opposite ends. Chains 236 are trained around the respective pairs of sprockets 234, 235 and have sides or runs fixed to the jig base 230. One end 231a of the drive shaft extends out beyond the bearing base 233, and two sprockets 237 are mounted on the end 231a. A cylinder 238 for vertically moving the jig 229 is vertically mounted by a bracket 239 on the vertical frame member 202a over which the sprockets 237 are positioned. The cylinder 238 has a rod 238a having on its upper end an engagement member 240 coupled to chains 241 trained around the sprockets 237. When the cylinder 238 is actuated, the rod 238a is vertically moved to move the chains 241 thus rotating the sprockets 237 to rotate the drive shaft 231. Rotation of the drive shaft 231 causes the chains 236 trained around the sprockets 235, 234 to rotate to vertically move the jig base 230 to which the chains 236 are affixed. As a result, the jig 229 is also moved vertically. Denoted at 202c in FIG. 22 are stoppers for limiting downward movement of the base 230 by engaging the opposite ends of the jig base 230 on the vertical frame members 202a.

A heater 242 for heating the bumper beam 152 is disposed below the intermediate portion of the horizontal frame member 202b of the frame 202. The heater 242 has symmetrical heater elements 242a, 242b spaced in the direction normal to the sheet of FIG. 22. The heater elements 242a, 242b are positioned so as to be aligned respectively with the joining surfaces 153c, 154c and 153d, 154d of the bumper beam 152, and are supported on respective front and rear symmetrical holders 243, 244 which are pivotally supported. As shown in FIG. 22, the heater elements 242a, 242b are long in the lateral direction of the apparatus and have a shape complementary to the front and rear fusing surfaces 153c, 154c and 153d, 154d of the bumper beam 152. The holders 243, 244 are pivotally supported on respective depending arms 243a, 244a and coupled by links 247 to rods 245a of front and rear cylinders 245, 246 spaced from each other. The cylinders 245, 246 are suported on the horizontal frame member 202b by means of brackets 248. Upon actuation of the cylinders 245, 246, the holders 243, 244 are selectively closed and opened to move the heater elements 242a, 242b toward and away from each other, or close and open the heater 242. In FIG. 23, the heater 242 is closed and the heater elements 242a, 242b are in a lowered position.

A process of fusing the bumper beam 152 to the bumper face 151 using the fusing apparatus 200 will be described below.

Figure 26:
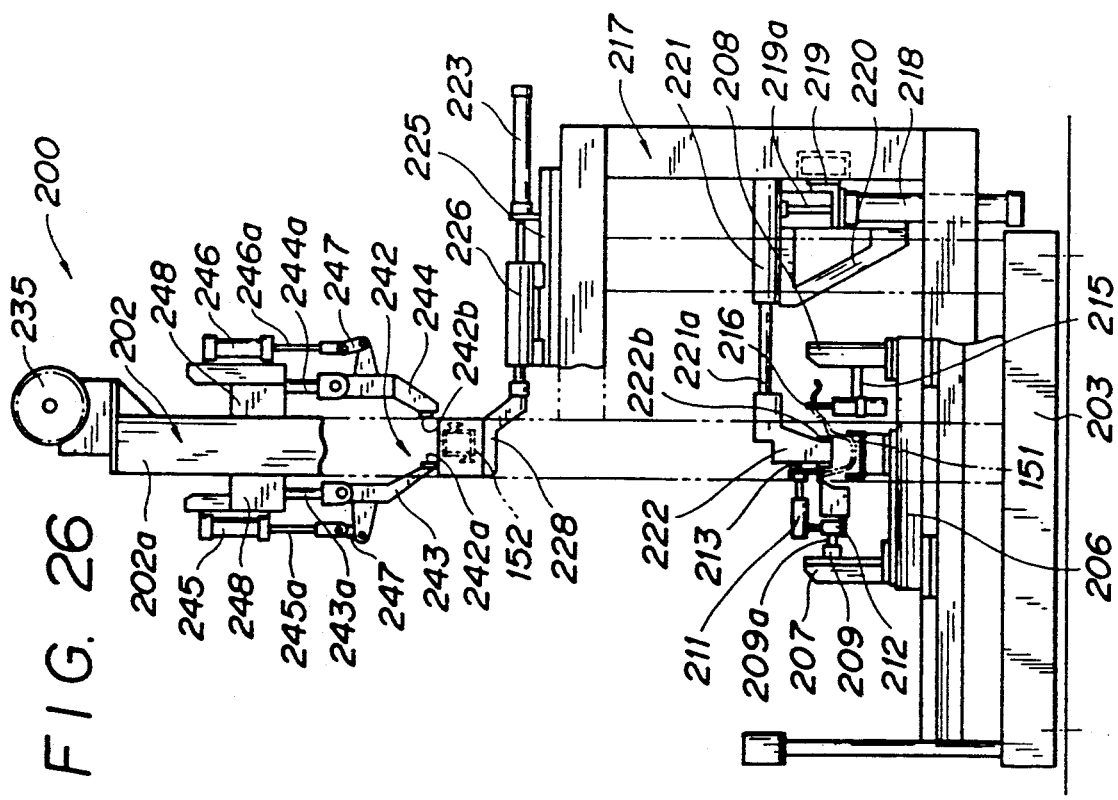

(I) First, the bumper face 151 is placed on the jig 214 as shown in FIG. 23. As shown FIGS. 25A through 25D, the bumper face 151 is clamped by the clamp fingers 213, 216. The upper member 206 over the jig base 204 is moved to the right in FIG. 23, i.e., in the rearward direction of the apparatus, into a heating and melting position. Then, the cylinder 221 is driven, and the heater 222 for heating the bumper face 151 is positioned above the bumper face 151. Thereafter, the cylinder 218 is actuated to lower the heater 222 with the support base 220 and the cylinder 221 until the heater elements 222b are positioned within the body 151d of the bumper face 151, facing the inner surfaces of the upper and lower portions 151a, 151c of the bumper face 151. In the same manner as the process described with reference to FIGS. 8 through 13, the heater elements 222b confronts the inner joining surfaces of the body 151d in spaced relation. The heater elements 222b are energized to heat and melt the inner joining surfaces of the body 151d. At the same time, the cylinder 223 is actuated to retract the feed base 228 with the bumper beam 152 placed thereon, and the heater elements 242a of the heater 242 for heating the bumper beam 152 are elevated. The bumper beam 152 is set below the heater elements 242a of the heater 242, as shown in FIG. 26.

(II) Then, the jig 229 is lowered to grip the bumper beam 152, and thereafter lifted to bring the joining surfaces 153c, 154c and 153d, 154d of the bumper beam 152 between the heater elements 242a, 242b. The heater elements 242a, 242b are now disposed in facing but spaced relation to the joining surfaces 153c, 154c and 153d, 154d in the same manner as described with reference to FIGS. 8 through 13. These joining surfaces are then heated and melted by the heater elements 242a, 242b.

Figure 27:
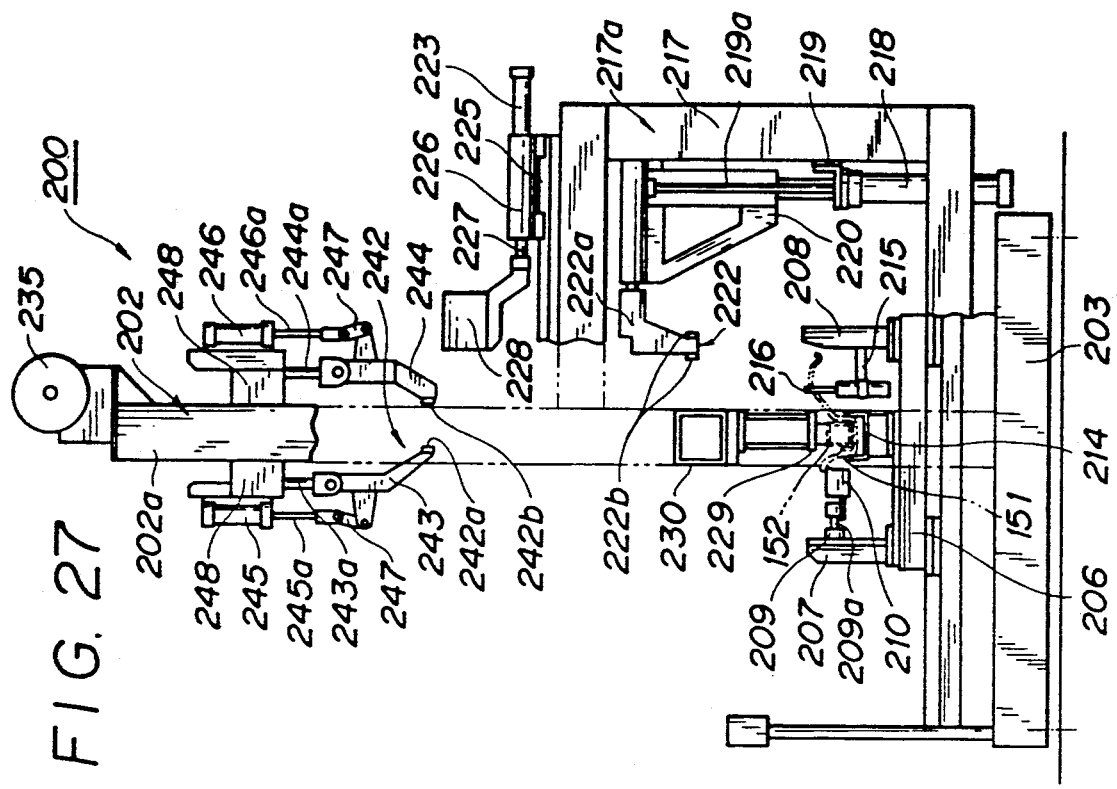
FIGS. 26 and 27 are views showing respective steps of melting and fusing the joining surfaces of the bumper face and beam.

(III) Thereafter, the heater 222 is lifted and then retracted out of the space above the bumper beam 152. The feed base 228 is simultaneously moved back out of the space below the bumper beam 152. Then, the jig 229 is lowered to position the bumper beam 152 within the body 151d of the bumper face 151, as shown in FIG. 27, where the joining surfaces of the bumper beam 152 and the bumper face 151 are held against each other. The rod 209a of the cylinder 209 and the rod 219 of the opposite cylinder (not shown) are moved toward each other to press the bumper beam 152 and the bumper face 151 together so that they are firmly fused to each other into a bumper 150.

(IV) Subsequently, the jig 229 is released, and the cylinder 209 and the opposite cylinder are also released, followed by returning movement of the jig base 204 to its original position. The clamp finger 213 is then released to discharge the bumper 150.

According to the apparatus 200, the FRP bumper beam 152 and the bumper face 151 of thermoplastic synthetic resin are automatically heated and fused to produce the resin bumper 150 in the successive process steps (I) through (IV). Therefore, the operation efficiency is increased, the manual labor is saved, the cost is lowered, and bumpers can be mass-produced. The fusing apparatus 200 can produce bumpers of various different shapes by replacing the jigs 229, 214 and the heaters 242, 222 with other jigs and heaters.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A method of fusing at least two parts of thermoplastic resin to each other at least one of said two parts being an FRP product made of fiberglass reinforced thermoplastic resin, comprising the steps of:

forming a plurality of projections containing thermoplastic resin only on a joining surface of said at least one part made of FRP, each of said projections having a width ranging from 3 to 10 mm and a height ranging from 0.5 to 1.0 mm, said projections defining grooves therebetween, each of said grooves having a width ranging from 0.5 to 1.0 mm;

brining heaters into close proximity with joining surfaces to be fused of said at least two parts with a prescribed spacing therebetween for melting (i) said projections formed on said joining surface at least one part made of FRP and (ii) said joining surface of the other of said at least two parts; and pressing the melted joining surfaces against each other to fuse said parts together.

2. A method according to claim 1, wherein said spacing ranges from 5 to 15 mm and said at least two parts are made of polypropylene, said heaters being heated to a temperature ranging from 500 to 600° C.

3. A method according to claim 1, wherein said at least two parts comprise two members jointly forming a bumper beam for reinforcing a bumper face of an automobile bumper.

4. A method according to claim 1, wherein said at least two parts comprise a bumper face and a bumper beam adapted to be mounted on an automobile body and reinforcing said bumper face, said bumper face and said bumper beam jointly constituting an automobile bumper.

5. A method according to claim 1, wherein said at least two parts comprise a bumper face and two members constituting a bumper beam for reinforcing the bumper face, said bumper face and said two members jointly forming an automobile bumper.

6. A method according to claim 1, wherein said parts are fused by:

setting said parts on a first clamping jig while said parts are being placed one on the other with said joining surfaces of the parts confronting each other;

sandwiching the set parts between said first clamping jig and a second clamping jig by means of said second clamping jig so that said parts are clamped respectively by said first and second clamping jigs; and moving said first and second clamping jigs away from each other to separate said parts from each other, moving said heaters between the separated parts, and brining said heaters into close proximity with said joining surfaces of the parts with said spacing therebetween to melt said joining surfaces;

said first and second clamping jigs being shaped complementarily to said parts for clamping the parts on said clamping jigs while correcting the parts to normal shapes thereof.

7. A method according to claim 1, wherein said projections are formed in a mosaic pattern with grooves defined therebetween.

* * * * *